(12) United States Patent
Ozawa

(10) Patent No.: US 11,333,500 B2
(45) Date of Patent: May 17, 2022

(54) INERTIAL MEASUREMENT APPARATUS, ELECTRONIC INSTRUMENT, AND MOVING OBJECT

(71) Applicant: Seiko Epson Corporation, Tokyo (JP)

(72) Inventor: Ryohei Ozawa, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/081,023

(22) Filed: Oct. 27, 2020

(65) Prior Publication Data

US 2021/0123736 A1 Apr. 29, 2021

(30) Foreign Application Priority Data

Oct. 28, 2019 (JP) .............................. JP2019-194913

(51) Int. Cl.
*G01C 19/5776* (2012.01)

(52) U.S. Cl.
CPC .................................. *G01C 19/5776* (2013.01)

(58) Field of Classification Search
CPC ............ G01C 19/5776; G01C 19/5649; G01C 19/5747
See application file for complete search history.

(56) References Cited

U.S. PATENT DOCUMENTS

| | | | | |
|---|---|---|---|---|
| 6,040,625 A * | 3/2000 | Ip | .......................... | B81B 7/007 257/719 |
| 6,776,041 B1 * | 8/2004 | Hauer | ................ | G01C 19/5712 73/504.09 |
| 9,257,372 B2 * | 2/2016 | Duca | ................... | H01L 23/3107 |
| 2005/0223800 A1 * | 10/2005 | Maurer | .............. | G01C 19/5712 73/535 |
| 2006/0162446 A1 * | 7/2006 | Ogura | ................ | G01C 19/5607 73/504.12 |
| 2007/0017288 A1 * | 1/2007 | Sato | .................... | G01C 19/5607 73/504.12 |
| 2011/0010924 A1 * | 1/2011 | Berger | .............. | G01C 19/5783 29/592.1 |
| 2011/0260740 A1 * | 10/2011 | Iwasawa | ............ | G01C 19/5776 324/679 |
| 2012/0318059 A1 * | 12/2012 | Otsuki | .................. | H01L 23/057 73/504.12 |

(Continued)

FOREIGN PATENT DOCUMENTS

JP 2011-085441 A 4/2011

*Primary Examiner* — David J Bolduc
(74) *Attorney, Agent, or Firm* — Harness, Dickey & Pierce, P.L.C.

(57) ABSTRACT

An inertial measurement apparatus includes a first gyro sensor that has a detection axis set in the direction of a first axis, is driven at a first drive frequency, and detects angular velocity around the first axis, a second gyro sensor that has a detection axis set in the direction of a second axis, is driven at a second drive frequency, and detects angular velocity around the second axis, a third gyro sensor that has a detection axis set in the direction of a third axis, is driven at a third drive frequency, and detects angular velocity around the third axis, and a substrate on which the first, second, and third gyro sensors are provided. The natural vibration frequency of the substrate is set at a frequency that does not coincide with any of fd1, fd2, and fd3, where fd1, fd2, and fd3 represent the first, second, and third drive frequencies.

13 Claims, 20 Drawing Sheets

(56) References Cited

U.S. PATENT DOCUMENTS

| | | | |
|---|---|---|---|
| 2013/0197858 A1* | 8/2013 | Egretzberger | G01C 19/5712 702/145 |
| 2014/0008737 A1* | 1/2014 | Koduri | G01P 15/0802 257/415 |
| 2014/0069188 A1* | 3/2014 | Waters | G01C 19/5607 73/504.16 |
| 2014/0217566 A1* | 8/2014 | Goida | H01L 23/10 257/676 |
| 2015/0114117 A1* | 4/2015 | Nakagawa | G01C 19/5733 73/504.16 |
| 2015/0300820 A1* | 10/2015 | Uchida | G01C 19/574 73/504.16 |
| 2015/0330785 A1* | 11/2015 | Naono | G01P 15/097 73/504.12 |
| 2017/0010135 A1* | 1/2017 | Hansen | B81C 1/00325 |
| 2017/0016725 A1* | 1/2017 | Shimizu | G01C 19/5642 |
| 2017/0219348 A1* | 8/2017 | Barone | G01B 5/24 |
| 2017/0336436 A1* | 11/2017 | Maegawa | H05K 5/0078 |
| 2018/0052012 A1* | 2/2018 | Nishizawa | G01C 19/5776 |
| 2019/0277873 A1* | 9/2019 | Sato | G01C 9/02 |
| 2020/0191571 A1* | 6/2020 | Fujiyoshi | B81B 3/0062 |
| 2020/0200533 A1* | 6/2020 | Sasaki | G01C 19/5712 |
| 2020/0208972 A1* | 7/2020 | Soejima | H01L 41/1136 |
| 2020/0300627 A1* | 9/2020 | Maegawa | G01C 19/56 |

* cited by examiner

FIG. 3
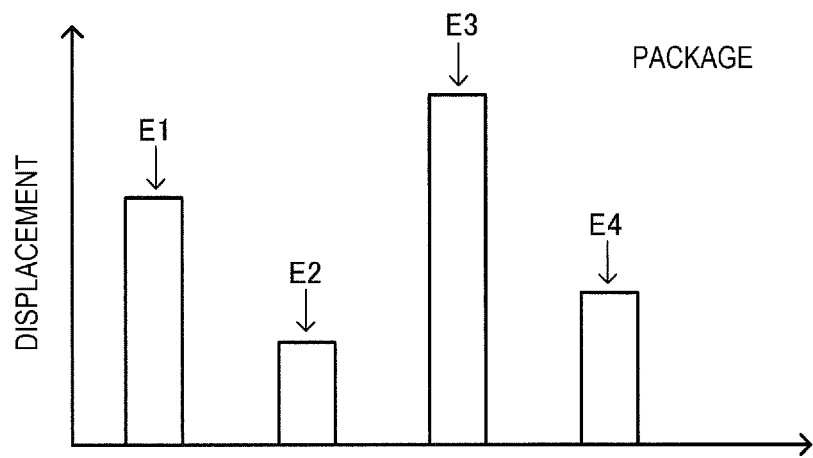
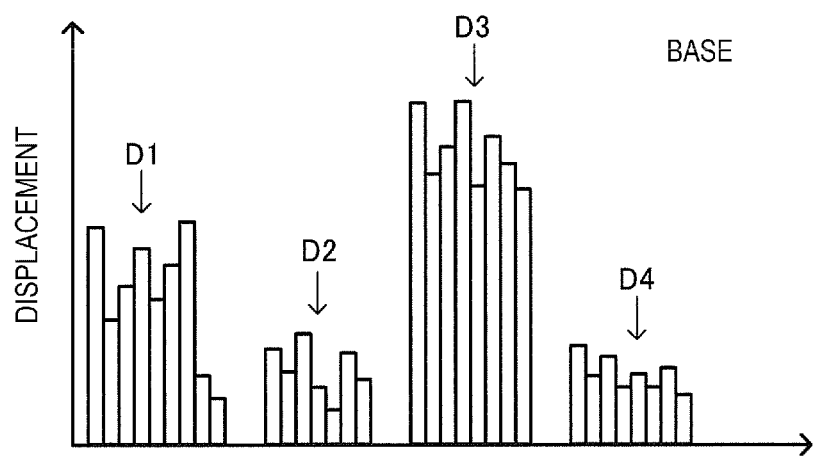

FIG. 20

|  | HIGH-MELTING-POINT SOLDER | | BRAZING MATERIAL | | |
|---|---|---|---|---|---|
|  | Sn/Sb5 | Sn/Sb10 | GOLD BRAZING MATERIAL | SILVER BRAZING MATERIAL | COPPER BRAZING MATERIAL |
| MELTING POINT | HIGHER THAN OR EQUAL TO 240°C | HIGHER THAN OR EQUAL TO 245°C | HIGHER THAN OR EQUAL TO 800°C | HIGHER THAN OR EQUAL TO 600°C | HIGHER THAN OR EQUAL TO 600°C |

INERTIAL MEASUREMENT APPARATUS, ELECTRONIC INSTRUMENT, AND MOVING OBJECT

The present application is based on, and claims priority from JP Application Serial Number 2019-194913, filed Oct. 28, 2019, the disclosure of which is hereby incorporated by reference herein in its entirety.

BACKGROUND

1. Technical Field

The present disclosure relates to an inertial measurement apparatus, an electronic instrument, a moving object, and the like.

2. Related Art

JP-A-2011-85441 discloses a mold structure that accommodates an inertial sensor. In the mold structure disclosed in JP-A-2011-85441, a common on-substrate wiring pattern allows use of a same-structure inertial sensor irrespective of the inertial sensor mounting form and the mounting substrate installation direction. JP-A-2011-85441 further discloses that a gyro sensor that is a vibration-type angular velocity sensor is accommodated as the inertial sensor in the mold structure.

When the gyro sensor, which is an inertial sensor, is mounted on the substrate, and the vibration of the gyro sensor leaks to the substrate so that the substrate resonates, a problem of deterioration of the sensor characteristics of the gyro sensor occurs. In this case, such a problem can be avoided, for example, by employing a method for covering and fixing the gyro sensor mounted on the substrate with a resin-potting-based adhesive member. The resin potting cannot, however, be used in a certain situation. Further, when a plurality of gyro sensors having different detection axes are mounted on a substrate, it is also necessary to consider the frequency at which the plurality of gyro sensors are driven and the form in which the plurality of gyro sensors are mounted.

SUMMARY

An aspect of the present disclosure relates to an inertial measurement apparatus including a first gyro sensor that has a detection axis set in a direction of a first axis, is driven at a first drive frequency, and detects angular velocity around the first axis, a second gyro sensor that has a detection axis set in a direction of a second axis, is driven at a second drive frequency different from the first drive frequency, and detects angular velocity around the second axis, a third gyro sensor that has a detection axis set in a direction of a third axis, is driven at a third drive frequency different from the first and second drive frequencies, and detects angular velocity around the third axis, and a substrate on which the first, second, and third gyro sensors are provided, and a natural vibration frequency of the substrate is set at a frequency that does not coincide with any of fd1, fd2, and fd3, where fd1 represents the first drive frequency, fd2 represents the second drive frequency, and fd3 represents the third drive frequency.

BRIEF DESCRIPTION OF THE DRAWINGS

FIG. 3 shows correlation between the displacement of a base of the gyro sensor and the displacement of a package of the gyro sensor.

FIG. 20 describes a method using high-melting-point solder or brazing material.

DESCRIPTION OF EXEMPLARY EMBODIMENTS

An embodiment of the present disclosure will be described below. It is not intended that the present embodiment described below unduly limits the contents set forth in the appended claims. Further, all configurations described in the present embodiment are not necessarily essential configuration requirements.

1. Inertial Measurement Apparatus, Gyro Sensor

Figure 1:
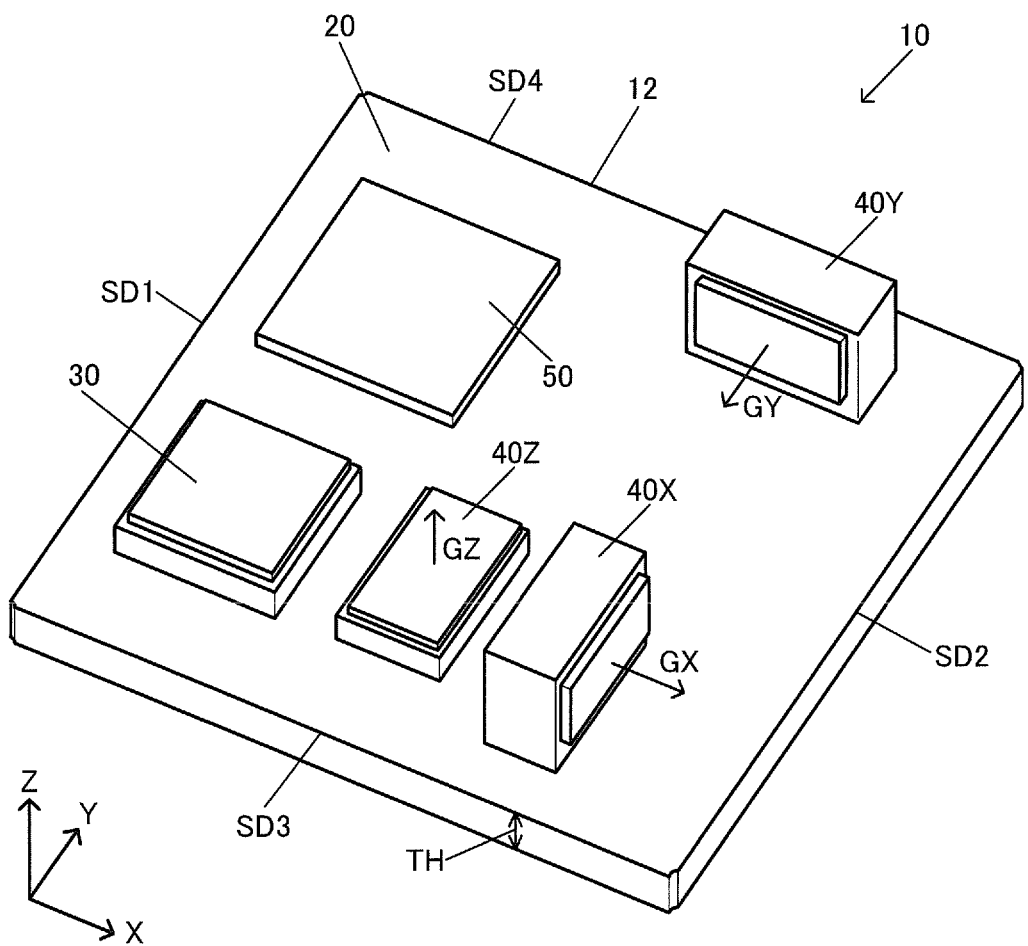
FIG. 1 is a perspective view showing an example of the configuration of an inertial measurement apparatus according to an embodiment of the present disclosure.

FIG. 1 is a perspective view showing an example of the configuration of an inertial measurement apparatus 10 according to the present embodiment. The inertial measurement apparatus 10 according to the present embodiment, which is an inertial measurement unit (IMU), includes gyro sensors 40X, 40Y, and 40Z, which are each an angular velocity sensor, and a substrate 20, on which the gyro sensors 40X, 40Y, and 40Z are provided, as shown in FIG. 1. The gyro sensors 40X, 40Y, and 40Z are first, second, third gyro sensors, respectively. The inertial measurement apparatus 10 can further include an acceleration sensor 30 and a processing section 50. The acceleration sensor 30 and the processing section 50 are also provided on the substrate 20. Inertial sensors, such as the gyro sensors 40X, 40Y, and 40Z and the acceleration sensor 30, and the substrate 20, on which the inertial sensors are provided, form a sensor module 12. The sensor module 12 is a module part including at least one inertial sensor.

Figure 12:
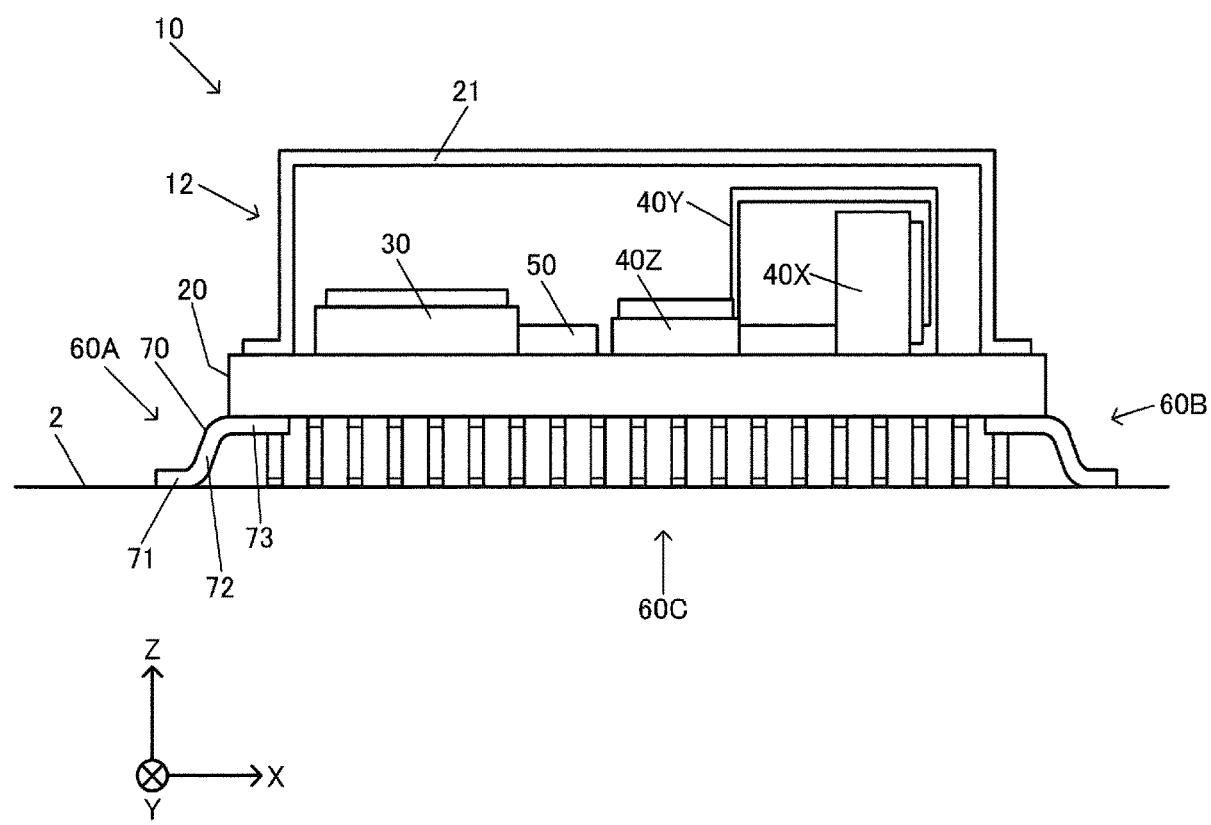
FIG. 12 is a side view showing the example of the detailed configuration of the inertial measurement apparatus.

In FIG. 1, axes X and Y are axes parallel to the principal surface of the substrate 20 and perpendicular to each other. An axis Z is an axis perpendicular to the principal surface of the substrate 20 and perpendicular to the axes X and Y. For example, the axis X is a first axis, the axis Y is a second axis, and the axis Z is a third axis. The principal surface of the substrate 20 is the upper or bottom surface of the substrate 20. The substrate 20 has an edge SD1, an edge SD2, which faces the edge SD1, an edge SD3, which is perpendicular to the edges SD1 and SD2, and an edge SD4, which faces the edge SD3. The edges SD1, SD2, SD3, and SD4 are first, second, third, and fourth edges, respectively. For example, the axis X is the direction from the edge SD1 toward the edge SD2, and the axis Y is the direction from the edge SD3 toward the edge SD4. The axis Z is the direction from an attachment surface 2, which is shown in FIG. 12, which will be described later, and to which the inertial measurement apparatus 10 is attached, toward the substrate 20. The attachment surface 2 is, for example, a surface of an attachment target substrate or any other substrate to which the inertial measurement apparatus 10 is attached, and the attachment target substrate is, for example, a customer substrate used by a customer of the inertial measurement apparatus 10.

The gyro sensor 40X, which is the first gyro sensor, is driven, for example, at a first drive frequency and detects angular velocity around the axis X, which is the first axis. For example, the gyro sensor 40X has a detection axis GX so set as to extend in the direction of the axis X and detects angular velocity around the axis X, as shown in FIG. 1. The gyro sensor 40Y, which is the second gyro sensor, is driven, for example, at a second drive frequency different from the first drive frequency and detects angular velocity around the axis Y, which is the second axis. For example, the gyro sensor 40Y has a detection axis GY so set as to extend in the direction of the axis Y and detects angular velocity around the axis Y. The gyro sensor 40Z, which is the third gyro sensor, is driven, for example, at a third drive frequency different from the first and second drive frequencies and detects angular velocity around the axis Z, which is the third axis. For example, the gyro sensor 40Z has a detection axis GZ so set as to extend in the direction of the axis Z and detects angular velocity around the axis Z.

As described above, the gyro sensors 40X, 40Y, and 40Z are so mounted on the substrate 20 that the detection axes GX, GY, and GZ thereof extend along the directions of the axes X, Y, and Z, respectively. A multi-axis gyro sensor capable of detecting angular velocity around the axes X, Y, and Z can thus be achieved. The multi-axis gyro sensor in the present embodiment may be a two-axis gyro sensor instead of a three-axis gyro sensor. In this case, two gyro sensors that detect angular velocity around two of the axes X, Y, and Z may be provided on the substrate 20. For example, the first gyro sensor 40X and the second gyro sensor 40Y are provided on the substrate 20, or one of two gyro sensors, the first gyro sensor 40X and the second gyro sensor 40Y, and the third gyro sensor 40Z are provided on the substrate 20.

Figure 2:
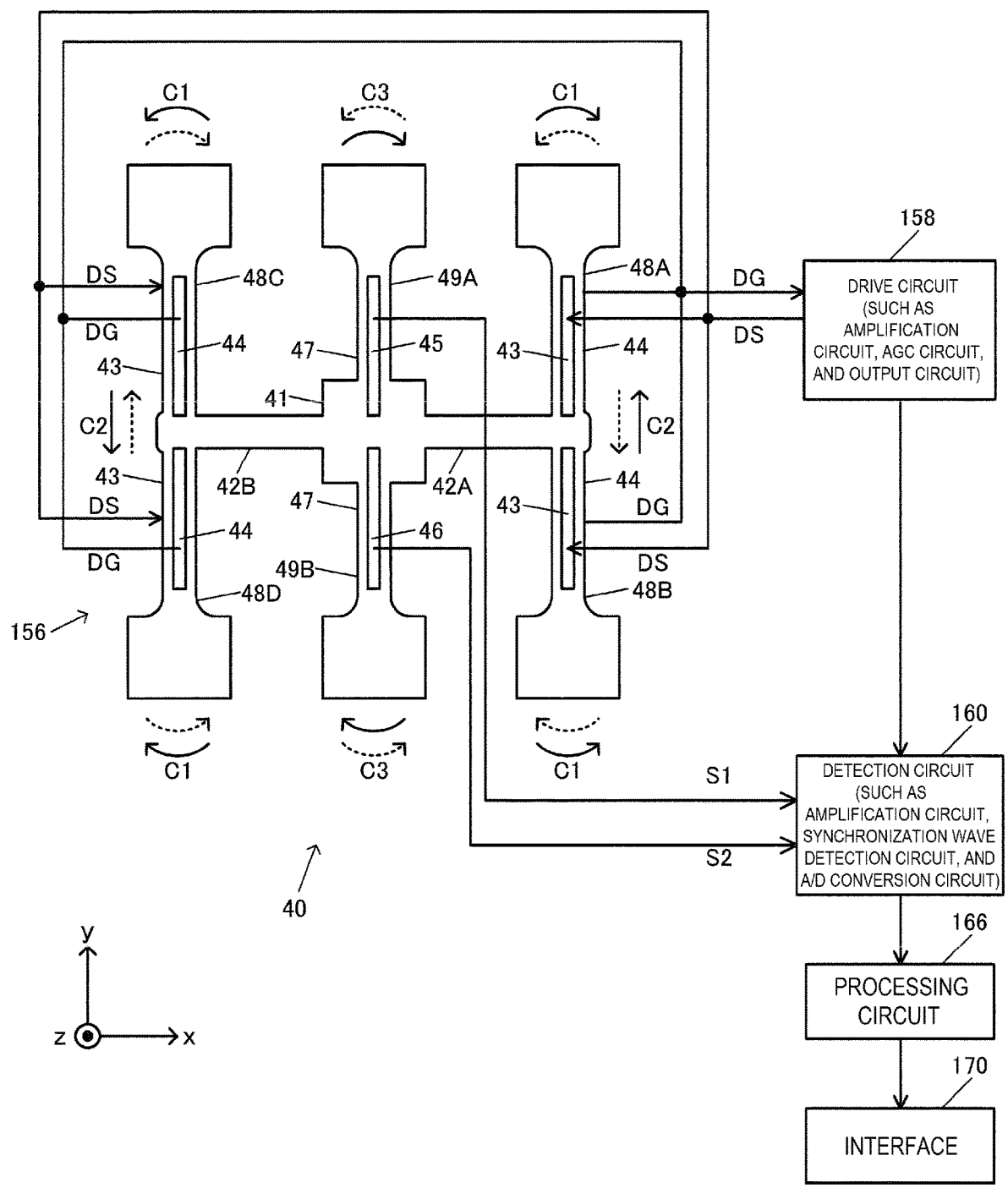
FIG. 2 is a plan view showing an example of the configuration of a gyro sensor.

The gyro sensors 40X, 40Y, and 40Z, which are each a vibration-type angular velocity sensor, each include a vibrator 156 as a gyro sensor device, as shown in FIG. 2, which will be described later. The gyro sensors 40X, 40Y, and 40Z detect the angular velocity with the vibrators 156 driven at drive frequencies different from one another, such as the first, second, and third drive frequencies. As described above, the gyro sensors 40X, 40Y, and 40Z, in which the vibrators 156 are driven at different frequencies, can reduce the influence of inter-axis interference in the multi-axis gyro sensor and therefore prevent a decrease in detection performance due to the inter-axis interference.

The acceleration sensor 30 is, for example, a sensor that detects acceleration in the X-axis direction, acceleration in the Y-axis direction, and acceleration in the Z-axis direction. The acceleration sensor 30 is, for example, a MEMS (micro electromechanical systems) acceleration sensor. Specifically, the acceleration sensor 30 is a MEMS capacitance-type acceleration sensor. The acceleration sensor may instead be an acceleration sensor using a quartz vibrator. The acceleration sensor 30 may, for example, be a sensor capable of detecting acceleration in the direction of at least one or in the directions of at least two of the axes X, Y, and Z. An acceleration sensor that detects acceleration in the direction of one or in the directions of two of the axes X, Y, and Z may be individually provided. For example, three acceleration sensors that detect acceleration in the directions of the axes X, Y, and Z may be provided, or an acceleration sensor that detects acceleration in the directions of the axes X and Y and an acceleration sensor that detects acceleration in the direction of the axis Z may be provided.

The substrate 20 is a substrate on which electronic parts are mounted, for example, a printed substrate that is a plate which is formed of an insulator and on which or in which conductor wiring is formed. The substrate 20, which is a circuit substrate, is a rigid substrate, desirably, a multilayer wiring substrate.

In the present embodiment, the substrate 20 is, for example, a ceramic substrate. For example, the substrate 20 is a glass ceramic substrate or an alumina ceramic substrate, such as a low-temperature simultaneously sintered ceramic substrate. Using a ceramic substrate as the substrate 20 allows the natural vibration frequency of the substrate 20 to be set, for example, at a high frequency as compared with using a resin substrate, whereby the natural vibration frequency is readily set at a frequency different from the drive frequencies. When a ceramic substrate is used as the substrate 20, the inertial sensors, such as the gyro sensors 40X, 40Y, and 40Z and the acceleration sensor 30, are each desirably an inertial sensor accommodated in a ceramic package. The ceramic material of which the package is made is, for example, alumina or aluminum nitride. The ceramic package includes, for example, a container and a lid, and an inertial sensor is accommodated and encapsulated in an accommodation space formed by the container and the lid. Using a ceramic substrate as the substrate 20 and using an inertial sensor accommodated in a ceramic package as described above allow the difference in the coefficient of linear expansion between the substrate 20 and the inertial sensor to be sufficiently small. Deterioration of the detection characteristics of the inertial sensor and a decrease in the reliability of mounting the inertial sensor on the substrate 20 due to stress resulting from the difference in the coefficient of linear expansion can therefore be suppressed.

The substrate 20 can instead be a resin substrate, such as a glass epoxy substrate and a BT substrate using BT resin (bismaleimide-triazine-based resin) manufactured by MITSUBISHI GAS CHEMICAL COMPANY, INC. The difference in the coefficient of linear expansion between the resin substrate and the ceramic package is desirably 30% or smaller, more desirably, 20% or smaller, further desirably, 10% or smaller. The difference in the coefficient of linear expansion between the substrate 20 and the inertial sensor can thus be sufficiently small. Deterioration of the detection characteristics of the inertial sensor and a decrease in the reliability of mounting the inertial sensor on the substrate due to stress resulting from the difference in the coefficient of linear expansion can therefore be suppressed.

The sensor module 12 is a module part formed of the inertial sensors and the substrate 20 integrated with each other. The sensor module 12 includes the substrate 20, the inertial sensors, such as the gyro sensors 40X, 40Y, and 40Z and the acceleration sensor 30 mounted on the substrate 20, and an enclosure 21, as shown, for example, in FIGS. 11 and 12, which will be described later. The enclosure 21 is intended to encapsulate the inertial sensors, such as the gyro sensors 40X, 40Y, and 40Z and the acceleration sensor 30, and mounted parts that are electronic parts, such as the inertial sensors, are accommodated in an accommodation space formed by the substrate 20 and the enclosure 21. For example, the substrate 20 and the enclosure 21 form a package of the sensor module 12. The enclosure 21 is formed of an electrically conductive member made, for example, of a metal. The package of the sensor module 12 may instead be achieved by resin molding.

The inertial measurement apparatus 10 can further include the processing section 50. The processing section 50 is mounted on the substrate 20 and carries out processes based on information detected with the inertial sensors. The processing section 50 is a processing circuit and can be achieved by a processor, for example, an MPU and a CPU. The processing section 50 may instead be achieved by an ASIC (application specific integrated circuit) formed by automatically placed wiring, such as a gate array. Further, circuit parts, for example, resisters and capacitors are mounted as the mounted parts on the substrate 20.

In FIG. 1, the acceleration sensor 30 is provided in addition to the gyro sensors 40X, 40Y, and 40Z as the inertial sensors. The acceleration sensor 30 may instead not be provided. Still instead, the processing section 50 may not be provided on the substrate 20, and the processes carried out by the processing section 50 may be carried out by an integrated circuit apparatus provided in each of the gyro sensors 40X, 40Y, and 40Z.

FIG. 2 shows an example of the detailed configuration of a gyro sensor 40, which is any of the gyro sensors 40X, 40Y, and 40Z in FIG. 1. The gyro sensor 40 in FIG. 2 detects angular velocity around an axis z. The gyro sensors 40X, 40Y, and 40Z in FIG. 1 are each so disposed that the direction of the axis z, which is the detection axis, coincides with the corresponding one of the axes X, Y, and Z.

The gyro sensor 40 includes the vibrator 156, a drive circuit 158, a detection circuit 160, a processing circuit 166, and an interface 170, and the vibrator 156, which is a gyro sensor device, and an integrated circuit apparatus (IC) that achieves the circuits described above are accommodated in the package. The drive circuit 158 can include an amplification circuit to which a feedback signal DG is inputted from the vibrator 156 and which amplifies the signal, an AGC circuit that performs automatic gain control, an output circuit that outputs a drive signal DS to the vibrator 156, and other circuits. For example, the AGC circuit automatically adjusts the gain variably in such a way that the amplitude of the feedback signal DG from the vibrator 156 is fixed. The output circuit outputs the drive signal DS, for example, having a rectangular waveform to the vibrator 156. The frequency of the drive signal DS is the frequency at which the vibrator 156 is driven. The detection circuit 160 can include an amplification circuit, a synchronization wave detection circuit, an A/D conversion circuit, and other circuits. The amplification circuit receives detection signals S1 and S2 as an input from the vibrator 156 and performs electric charge-voltage conversion and signal amplification on the detection signals S1 and S2, which are differential signals. The synchronization wave detection circuit uses a sync signal from the drive circuit 158 to perform synchronization wave detection for extracting a desired wave. The A/D conversion circuit converts an analog detection signal after the synchronization wave detection into digital detection data and outputs the detection data to the processing circuit 166. The processing circuit 166 performs a variety of types of processing on the detection data, such as zero point correction, sensitivity adjustment, filtering, and temperature correction and outputs processed detection data to the interface 170.

In FIG. 2, a vibrator having a double-T structure is used as the vibrator 156. A tuning-fork-shaped or H-shaped vibrator may be used as the vibrator 156. The vibrator 156 includes drive arms 48A, 48B, 48C, and 48D, detection arms 49A and 49B, a base 41, and linkage arms 42A and 42B. The detection arms 49A and 49B extend from the base 41, which has a rectangular shape, in a +y-axis direction and a −y-axis direction, respectively. The linkage arms 42A and 42B extend from the base 41 in a +x-axis direction and a −x-axis direction, respectively. The drive arms 48A and 48B extend from a tip portion of the linkage arm 42A in the +y-axis direction and the −y-axis direction, respectively, and the drive arms 48C and 48D extend from a tip portion of the linkage arm 42B in the +y-axis direction and the −y-axis direction, respectively. A weight for frequency adjustment is provided at the tip of each of the drive arms 48A, 48B, 48C, and 48D and the detection arms 49A and 49B. The vibrator 156 detects angular velocity around the axis z, which is the thickness direction of the vibrator 156.

Drive electrodes 43 are formed on the upper and lower surfaces of each of the drive arms 48A and 48B, and drive electrodes 44 are formed on the right and left side surfaces of each of the drive arms 48A and 48B. The drive electrodes 44 are also formed on the upper and lower surfaces of each of the drive arms 48C and 48D, and the drive electrodes 43 are also formed on the right and left side surfaces of each of the drive arms 48C and 48D. The drive signal DS from the drive circuit 158 is supplied to the drive electrodes 43, and the feedback signal DG from each of the drive electrodes 44 is inputted to the drive circuit 158. Detection electrodes 45 are formed on the upper and lower surfaces of the detection arm 49A, and ground electrodes 47 are formed on the right and left side surfaces of the detection arm 49A. Detection electrodes 46 are formed on the upper and lower surfaces of the detection arm 49B, and the ground electrodes 47 are also formed on the right and left side surfaces of the detection arm 49B. The detection signals S1 and S2 from the detection electrodes 45 and 46 are then inputted to the detection circuit 160.

The action of the gyro sensor 40 will next be described. When the drive circuit 158 applies the drive signal DS to the drive electrodes 43, the inverse piezoelectric effect causes the drive arms 48A, 48B, 48C, and 48D to undergo bending vibration, as indicated by the arrows C1 in FIG. 2. For example, the vibration form indicated by the solid-line arrows and the vibration form indicated by the dotted-line arrows are repeated at a predetermined frequency. That is, the tips of the drive arms 48A and 48C undergo bending vibration that causes the tips to repeatedly approach each other and separate from each other, so do the drive arms 48B and 48D. At this point, since the drive arms 48A, 48B and the drive arms 48C, 48D perform linearly symmetric vibration with respect to the axis x, which passes through the center of gravity of the base 41, the base 41, the linkage arms 42A and 42B, and the detection arms 49A and 49B hardly vibrate.

In this state, when angular velocity around the axis z as the axis of rotation acts on the vibrator 156, Coriolis force causes the drive arms 48A, 48B, 48C, and 48D to vibrate, as indicated by the arrows C2. That is, the Coriolis force in the directions indicated by the arrows C2, which are perpendicular to the direction indicated by the arrows C1 and the direction of the axis z, acts on the drive arms 48A, 48B, 48C, and 48D to produce vibration components in the directions indicated by the arrows C2. The vibration indicated by the arrows C2 is transmitted to the base 41 via the linkage arms 42A and 42B to cause the detection arms 49A and 49B to undergo bending vibration in the directions indicated by the arrows C3. Electric charge signals produced by the piezoelectric effect resulting from the bending vibration of the detection arms 49A and 49B are inputted as the detection signals S1 and S2 to the detection circuit 160, whereby the angular velocity around the axis z is detected.

The inertial measurement apparatus 10 according to the present embodiment described above includes the gyro sensors 40X, 40Y, and 40Z, which are driven at the first, second, and third drive frequencies and detect the angular velocity around the axes X, Y, and Z, and the substrate 20, on which the gyro sensors 40X, 40Y, and 40Z are provided. In the present embodiment, let fd1 be the first drive frequency, fd2 be the second drive frequency, and fd3 be the third drive frequency, and the natural vibration frequency of the substrate 20 is set at a frequency that does not coincide with any of fd1, fd2, and fd3. That is, the natural vibration frequency of the substrate 20 is set at a frequency different from the drive frequencies fd1, fd2, and fd3. The natural vibration frequency of the substrate 20 can be set, for example, by adjusting a thickness TH of the substrate 20 shown in FIG. 1. A variety of other methods for adjusting the natural vibration frequency of the substrate 20 are conceivable, for example, by adjusting the dimensions of the substrate 20, such as the lengths of the edges SD1, SD2, SD3, and SD4, providing the substrate 20 with a member for adjusting the natural vibration frequency thereof, or changing the material of the substrate 20. It can be said that the natural vibration frequency of the substrate 20 is, for example, the natural vibration frequency of the sensor module 12, in which the electronic parts, such as inertial sensors, are mounted on the substrate 20. In the present embodiment, the gyro sensors 40X, 40Y, and 40Z are collectively referred to as the gyro sensors 40 as appropriate and as required.

The vibrator 156, which is the vibration element of the gyro sensor 40 in FIG. 2, has a symmetric structure in the plane xy and vibrates in symmetric directions, so that the produced vibration components cancel each other. The vibration leakage in the plane xy is therefore extremely small. In contrast, in the z-axis direction, which is the direction of the detection axis perpendicular to the plane xy, the structure is not symmetric because the weights, that serve as hammer heads, are provided, and the vibration therefore undesirably leaks out of the gyro sensor 40. That is, vibration leakage occurs in the z-axis direction, and the vibration leakage is undesirably transmitted to the environment outside the gyro sensor 40 via the package thereof.

For example, FIG. 3 shows correlation between the displacement of the base 41 of the gyro sensor 40 and the displacement of the package of the gyro sensor 40. When the base 41 of the vibrator 156 of the gyro sensor 40 is displaced as indicated by D1, D2, D3 and D4, the package of the gyro sensor 40 is also displaced accordingly as indicated by E1, E2, E3 and E4, and the displacement of the base 41 correlates with the displacement of the package. The displacement of the package is the displacement at measurement points set in predetermined positions, for example, the positions of the corners of the principal surface of the package of the gyro sensor 40. When the base 41 of the vibrator 156 is displaced in the z-axis direction due to the vibration leakage described above, the package of the gyro sensor 40 is also displaced in the direction z accordingly. The displacement of the package is then undesirably transmitted as the vibration leakage to the substrate 20, on which the gyro sensors 40 are mounted as shown in FIG. 1. When the frequency of the vibration that forms the vibration leakage coincides with the natural vibration frequency of the substrate 20, the substrate 20 undesirably resonates. The vibration of the resonating substrate 20 then produces, for example, noise and adversely affects the sensor characteristics of the gyro sensors 40, and the resonance of the substrate 20 causes the vibration energy to be absorbed by the substrate 20, resulting, for example, in a problem of unstable driving of the vibrator 156 of each of the gyro sensors 40.

To address the problem described above, the natural vibration frequency of the substrate 20 is set in the present embodiment at a frequency that does not coincide with any of the drive frequencies at which the gyro sensors 40X, 40Y, and 40Z are driven, as will be described in detail in FIGS. 4 to 10, which will be described later. That is, a substrate having a natural vibration frequency that does not coincide with any of the drive frequencies fd1, fd2, and fd3 is used as the substrate 20 on which the gyro sensors 40X, 40Y, and 40Z are mounted. The configuration described above, which prevents the vibration of the gyro sensors 40X, 40Y, and 40Z driven at the drive frequencies fd1, fd2, and fd3 from leaking out of the gyro sensors 40X, 40Y, and 40Z so that the vibration leakage causes the substrate 20 to resonate, can prevent deterioration of the sensor characteristics of the gyro sensors 40X, 40Y, and 40Z and unstable driving of the gyro sensors 40X, 40Y, and 40Z. Further, the configuration in which the drive frequencies fd1, fd2, and fd3, at which the gyro sensors 40X, 40Y, and 40Z are driven, differ from one another can reduce the influence of the inter-axis interference in the multi-axis gyro sensor and therefore prevent a decrease in the detection performance due to the inter-axis interference. The provided inertial measurement apparatus 10 can therefore reduce the adverse effect due to the resonance of the substrate 20 and the adverse effect due to the inter-axis interference while achieving a multi-axis gyro sensor including the gyro sensors 40X, 40Y, and 40Z provided on the substrate 20.

Figure 11:
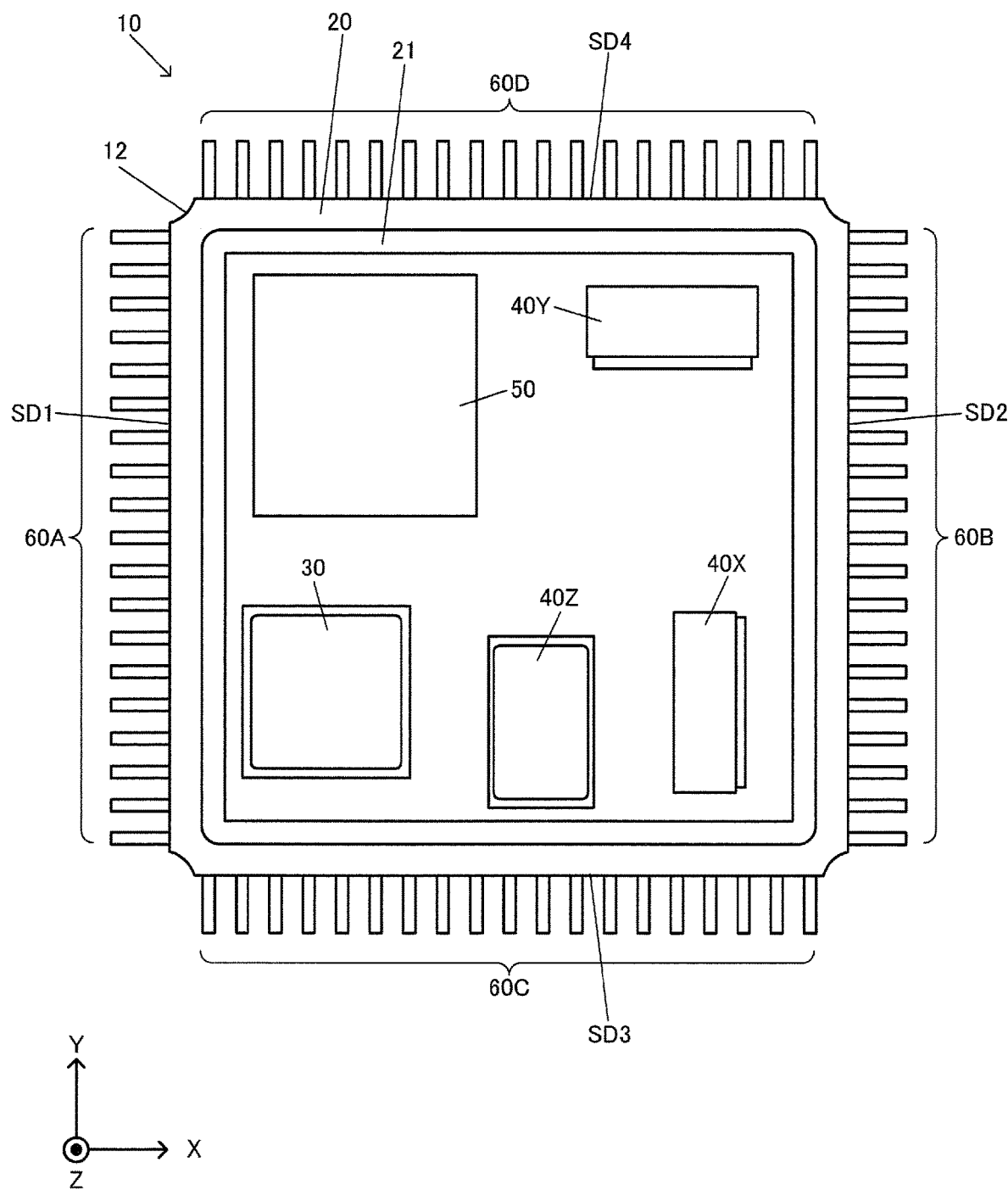
FIG. 11 is a plan view showing an example of the detailed configuration of the inertial measurement apparatus.

For example, in the present embodiment, the sensor module 12 is configured only by providing the substrate 20 with the gyro sensors 40X, 40Y, and 40Z. The substrate 20 of the sensor module 12 can therefore be directly mounted on a substrate 4, such as a customer substrate, as shown in FIGS. 11 and 12. For example, a method for providing the sensor module 12 with a connector, coupling one end of a cable to the connector, and coupling the other end of the cable to an external apparatus is not preferable from the viewpoint of reliability, and coupling using, for example, solder is required, for example, in an in-vehicle instrument. It is therefore desired to directly mount the substrate 20 of the sensor module 12 onto the substrate 4, which is a customer substrate. In the situation in which the substrate 20 of the sensor module 12 is mounted onto the substrate 4, it is difficult to employ the method of covering and fixing the gyro sensors 40X, 40Y, and 40Z with a resin-potting-based adhesive member. The problems resulting from the resonance of the substrate 20, which do not occur with the method using resin potting, therefore undesirably occur. In this regard, the present embodiment, the problems resulting from the resonance of the substrate 20 can be solved by setting the natural vibration frequency of the substrate 20 at a frequency that does not coincide with any of the drive frequencies fd1, fd2, and fd3 even in the situation that does not allows employing the method of covering and fixing the gyro sensors 40X, 40Y, and 40Z by using resin potting.

Assume that vibration modes resulting from vibration excitation in the directions of the axes X, Y, and Z are called X-axis, Y-axis, and Z-axis vibration modes, respectively. The axes X, Y, and Z are the first, second, and third axes, respectively, and the X-axis, Y-axis, and Z-axis vibration modes are first-axis, second-axis, and third-axis vibration modes, respectively. Under the definition described above, in the present embodiment, the natural vibration frequency of the substrate 20 in each of the X-axis, Y-axis, and Z-axis vibration modes is set at a frequency that does not coincide with any of the drive frequencies fd1, fd2, and fd3. That is, also in the vibration mode resulting from vibration excitation in any of the directions of the axes X, Y, and Z, the natural vibration frequency of the substrate 20 is set at a frequency that does not coincide with any of fd1, fd2, and fd3.

Figure 4:
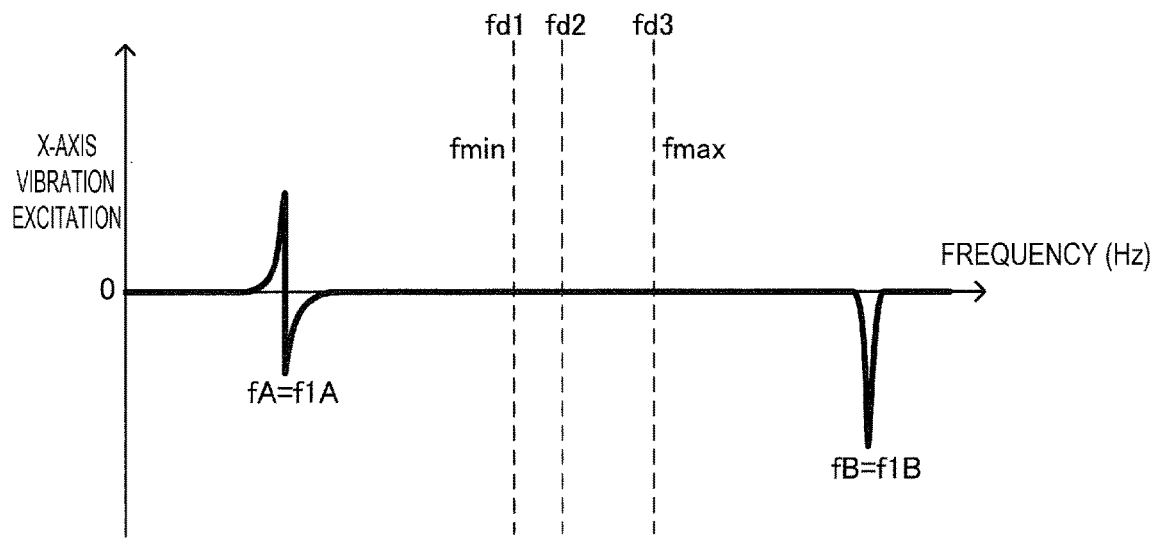
FIG. 4 shows the result of frequency analysis in X-axis vibration excitation with the thickness TH of a substrate being TH1.
Figure 5:
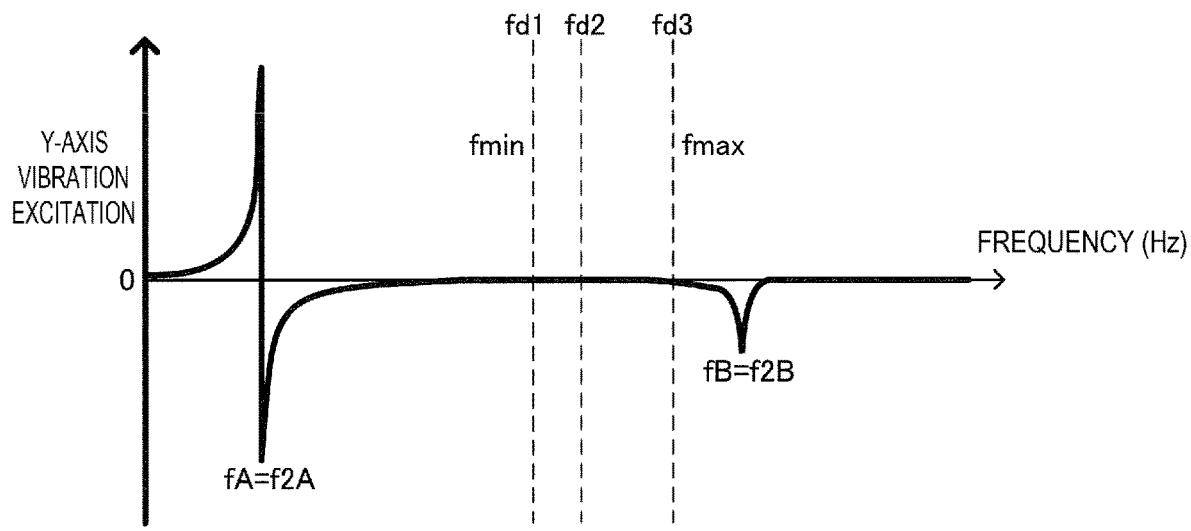
FIG. 5 shows the result of the frequency analysis in Y-axis vibration excitation with the thickness TH of the substrate being TH1.
Figure 6:
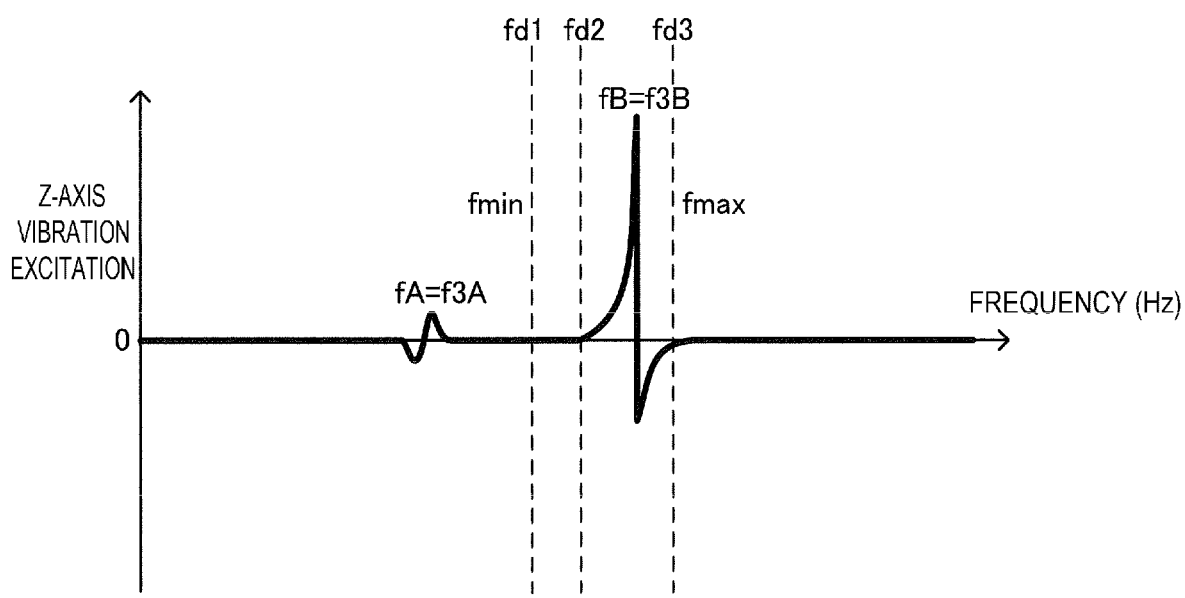
FIG. 6 shows the result of the frequency analysis in Z-axis vibration excitation with the thickness TH of the substrate being TH1.

For example, FIGS. 4, 5, and 6 show the results of frequency analysis with the thickness TH of the substrate 20 being TH1. FIGS. 4, 5, and 6 show the results of the frequency analysis in the X-axis vibration excitation, the Y-axis vibration excitation, and the Z-axis vibration excitation, respectively. The result of the frequency analysis in the X-axis vibration excitation is the result of the frequency analysis when the vibration excitation along the X-axis direction is performed on the substrate 20 in FIG. 1. Similarly, the result of the frequency analysis in the Y-axis vibration excitation is the result of the frequency analysis when the vibration excitation along the Y-axis direction is performed on the substrate 20, and the result of the frequency analysis in the Z-axis vibration excitation is the result of the frequency analysis when the vibration excitation along the Z-axis direction is performed on the substrate 20.

In the X-axis vibration excitation in FIG. 4, resonance of the substrate 20 due to the X-axis vibration mode resulting from the X-axis vibration excitation occurs at natural vibration frequencies fA and fB. In this case, in the present embodiment, natural vibration frequencies fA=f1A and fB=f1B of the substrate 20 in the X-axis vibration mode, which is the first-axis vibration mode, are set at frequencies that each do not coincide with any of the drive frequencies fd1, fd2, and fd3, at which the gyro sensors 40X, 40Y, and 40Z are driven, as shown in FIG. 4. For example, let fmin be the minimum of the frequencies fd1, fd2, and fd3, and let fmax be the maximum of the frequencies fd1, fd2, and fd3, and the relationship fA<fmin<fmax<fB is satisfied. Specifically, the relationship f1A<fmin<fmax<f1B is satisfied. The drive frequency fd1 is, for example, a frequency ranging, for example, from 48.5 to 50.0 kHz, the drive frequency fd2 is, for example, a frequency ranging, for example, from 50.5 to 52.0 kHz, and the drive frequency fd3 is, for example, a frequency ranging, for example, from 52.5 to 54.0 kHz. The thickness TH=TH1 of the substrate 20 in FIGS. 4 to 6 is, for example, a thickness ranging, for example, from 1.5 to 1.7 mm.

In the Y-axis vibration excitation in FIG. 5, resonance of the substrate 20 due to the Y-axis vibration mode resulting from the Y-axis vibration excitation occurs at natural vibration frequencies fA and fB. In this case, in the present embodiment, natural vibration frequencies fA=f2A and fB=f2B of the substrate 20 in the Y-axis vibration mode, which is the second-axis vibration mode, are set at frequencies that each do not coincide with any of the drive frequencies fd1, fd2, and fd3, as shown in FIG. 5. Specifically, the relationship fA<fmin<fmax<fB is satisfied, and the relationship f2A<fmin<fmax<f2B is satisfied.

In the Z-axis vibration excitation in FIG. 6, resonance of the substrate 20 due to the Z-axis vibration mode resulting from the Z-axis vibration excitation occurs at the natural vibration frequencies fA and fB. In this case, in the present embodiment, natural vibration frequencies fA=f3A and fB=f3B of the substrate 20 in the Z-axis vibration mode, which is the third-axis vibration mode, are set at frequencies that each do not coincide with any of the drive frequencies fd1, fd2, and fd3, as shown in FIG. 6.

As described above, in the present embodiment, in which the vibration mode resulting from the vibration excitation in the X-axis, Y-axis, and Z-axis directions are called the X-axis, Y-axis, and Z-axis vibration modes, the natural vibration frequencies of the substrate 20 in the X-axis, Y-axis, and Z-axis vibration modes are set at frequencies that each do not coincide with any of the drive frequencies fd1, fd2, and fd3.

For example, the natural vibration frequencies fA=f1A and fB=f1B of the substrate 20 in the X-axis vibration mode resulting from the X-axis vibration excitation are set at frequencies that each do not coincide with any of the drive fd1, fd2, and fd3, as shown in FIG. 4. The natural vibration frequencies fA=f2A and fB=f2B of the substrate 20 in the Y-axis vibration mode resulting from the Y-axis vibration excitation are set at frequencies that each do not coincide with any of the drive fd1, fd2, and fd3, as shown in FIG. 5. The natural vibration frequencies fA=f3A and fB=f3B of the substrate 20 in the Z-axis vibration mode resulting from the Z-axis vibration excitation are set at frequencies that each do not coincide with any of the drive fd1, fd2, and fd3, as shown in FIG. 6. As described above, in the present embodiment, in all the X-axis, Y-axis, and Z-axis vibration modes, the natural vibration frequencies fA and fB are each set at a frequency that does not coincide with any of the drive frequencies fd1, fd2, and fd3, at which the gyro sensors 40X, 40Y, and 40Z are driven.

In the present embodiment, the gyro sensors 40X, 40Y, and 40Z are so mounted on the substrate 20 that the detection axes GX, GY, and GZ thereof extend along the directions of the X-axis, Y-axis, and Z-axis, as shown in FIG. 1. The leakage of the vibration of the gyro sensors 40X, 40Y, and 40Z primarily occurs in the directions of the detection axes GX, GY, and GZ, as described above. That is, the leakage occurs in the direction of the axis z, which is the detection axis in FIG. 2. It has therefore been proved insufficient to consider only the natural vibration frequency in the vibration mode resulting from the vibration excitation in one of the directions of the axes X, Y, and Z in FIG. 1.

For example, assume that the natural vibration frequencies fA=f1A and fB=f1B in the X-axis vibration mode resulting from the X-axis vibration excitation in FIG. 4 are each set at a frequency that does not coincide with any of the drive frequencies fd1, fd2, and fd3. Even in this case, when any of the natural vibration frequencies fA=f2A, fB=f2B, fA=f3A, and fB=f3B in the Y-axis vibration mode resulting from the Y-axis vibration excitation and the Z-axis vibration mode resulting from the Z-axis vibration excitation coincides with any of the drive frequencies fd1, fd2, and fd3, the substrate 20 undesirably resonates in the Y-axis or Z-axis direction. That is, the resonance of the substrate 20 in the direction of the detection axis GX of the gyro sensor 40X can be avoided, but the resonance of the substrate 20 in any of the directions of the detection axes GY and GZ of the gyro sensors 40Y and 40Z cannot be avoided. The resonance of the substrate 20 therefore causes deterioration of the sensor characteristics, unstable driving of the vibrator 156, and other problems. Similarly, even when the natural vibration frequencies in the Y-axis vibration mode resulting from the Y-axis vibration excitation are each set at a frequency that does not coincide with any of the drive frequencies, the resonance of the substrate 20 in any of the directions of the detection axes GX and GZ of the gyro sensors 40X and 40Z cannot be avoided, and the substrate 20 therefore undesirably resonates in any of the X-axis and Z-axis directions. Even when the natural vibration frequencies in the Z-axis vibration mode resulting from the Z-axis vibration excitation are each set at a frequency that does not coincide with any of the drive frequencies, the resonance of the substrate 20 in any of the directions of the detection axes GX and GY of the gyro sensors 40X and 40Y cannot be avoided, and the substrate 20 therefore undesirably resonates in any of the X-axis and Y-axis directions.

In this regard, in the present embodiment, the natural vibration frequencies fA and fB are each set at a frequency that does not coincide with any of the drive frequencies fd1, fd2, and fd3, at which the gyro sensors 40X, 40Y, and 40Z are driven, in the X-axis, Y-axis, and Z-axis vibration modes. Therefore, even when the vibration leakage occurs in any of the detection axes GX, GY, and GZ of the gyro sensors 40X, 40Y, and 40Z, the resonance of the substrate 20 due to the vibration leakage can be avoided, whereby deterioration of the sensor characteristics and unstable driving of the vibrator can be avoided.

Further, for example, let fA be the natural vibration frequency of the substrate 20 in a first vibration mode that is any of the X-axis, Y-axis, and Z-axis vibration modes, and let fB be the natural vibration frequency of the substrate 20 in a second vibration mode that is any of the X-axis, Y-axis, and Z-axis vibration modes. The relationship fA<fmin<fmax<fB is satisfied in the present embodiment, where fmin is the minimum of the drive frequencies fd1, fd2, and fd3, and fmax is the maximum of fd1, fd2, and fd3.

For example, the first and second vibration modes are each the X-axis vibration mode in FIG. 4. The natural vibration frequency in the first vibration mode is fA=f1A, and the natural vibration frequency in the second vibration mode is fB=f1B. In this case, the relationship fA<fmin<fmax<fB is satisfied. That is, the natural vibration frequencies fA and fB are set at frequencies different from those that fall within the drive frequency range from fmin to fmax.

The first and second vibration modes are each the Y-axis vibration mode in FIG. 5. The natural vibration frequency in the first vibration mode is fA=f2A, and the natural vibration frequency in the second vibration mode is fB=f2B. In this case, the relationship fA<fmin<fmax<fB is satisfied. That is, the natural vibration frequencies fA and fB are set at frequencies different from those that fall within the drive frequency range from fmin to fmax.

The natural vibration frequencies fA and fB in the first and second vibration modes are thus set at frequencies different from those that fall within the drive frequency range from fmin to fmax. It is therefore ensured that the drive frequencies fd1, fd2, and fd3, which fall within the range from fmin to fmax, each do not coincide with any of the natural vibration frequencies fA and fB in the first and second vibration modes, whereby the resonance of the substrate 20 due to the vibration leakage can be avoided.

Further specifically, in the present embodiment, the relationships f1A<fmin<fmax<f1B and f2A<fmin<fmax<f2B are satisfied, where f1A and f1B represent two natural vibration frequencies adjacent to each other in the first-axis vibration mode, and f2A and f2B represent two natural vibration frequencies adjacent to each other in the second-axis vibration mode.

For example, in FIG. 4, the two natural vibration frequencies adjacent to each other in the X-axis vibration mode, which is the first-axis vibration mode, are fA=f1A and fB=f1B. The relationship f1A<fmin<fmax<f1B is then satisfied. In FIG. 5, the two natural vibration frequencies adjacent to each other in the Y-axis vibration mode, which is the second-axis vibration mode, are fA=f2A and fB=f2B. The relationship f2A<fmin<fmax<f2B is then satisfied. That is, in the present embodiment, the relationships f1A<fmin<fmax<f1B and f2A<fmin<fmax<f2B are satisfied, as shown in FIGS. 4 and 5.

Therefore, in the X-axis vibration mode in FIG. 4, the relationship f1A<fmin<fmax<f1B is satisfied, and also in the Y-axis vibration mode in FIG. 5, the relationship f2A<fmin<fmax<f2B is satisfied. That is, in both the X-axis and Y-axis vibration modes, the natural vibration frequencies fA and fB are set at frequencies different from those that fall within the drive frequency range from fmin to fmax. The resonance of the substrate 20 due to the vibration leakage can therefore be avoided in both the X-axis and Y-axis vibration modes, whereby deterioration of the sensor characteristics and unstable driving of the vibrator can be avoided.

Further, in the present embodiment, the natural vibration frequencies in the third-axis vibration mode are set at frequencies different from any of fd1, fd2, and fd3 in the frequency range that satisfies the relationships f1A<fmin<fmax<f1B and f2A<fmin<fmax<f2B.

For example, in FIG. 6, the natural vibration frequencies fA=f3A and fB=f3B in the Z-axis vibration mode, which is the third-axis vibration mode, are set at frequencies different from any of the drive frequencies fd1, fd2, and fd3 in the frequency range that satisfies the relationships f1A<fmin<fmax<f1B and f2A<fmin<fmax<f2B in FIGS. 4 and 5. That is, the natural vibration frequencies fA=f3A and fB=f3B in the Z-axis vibration mode are each set at a frequency that does not coincide with any of the drive frequencies fd1, fd2, and fd3. Therefore, the natural vibration frequencies each do not coincide with any of the drive frequencies fd1, fd2, and fd3 in the X-axis and Y-axis vibration modes, as shown in FIGS. 4 and 5, and the natural vibration frequencies each do not coincide with any of the drive frequencies fd1, fd2, and fd3 also in the Z-axis vibration mode, as shown in FIG. 6. The natural vibration frequencies fA and fB are therefore each set at a frequency that does not coincide with any of the drive frequencies fd1, fd2, and fd3 in all the X-axis, Y-axis, and Z-axis vibration modes. The resonance of the substrate 20 due to the leakage of the vibration of any of the gyro sensors 40X, 40Y, and 40Z can therefore be avoided, whereby deterioration of the sensor characteristics and unstable driving of the vibrator can be avoided.

The natural vibration frequency characteristics in the X-axis and Y-axis vibration modes have the same tendency, as will be described with reference, for example, to FIG. 10, which will be described later. For example, the natural vibration frequency characteristics with respect to the thickness TH of the substrate 20 have the same tendency. On the other hand, the natural vibration frequency characteristics in the Z-axis vibration mode and the natural vibration frequency characteristics in the X-axis and Y-axis vibration modes have different tendencies. In view of the fact described above, the natural vibration frequencies fA and fB are first set at frequencies different from those that fall within the drive frequency range from fmin to fmax in the X-axis and Y-axis vibration modes, as shown in FIGS. 4 and 5. The natural vibration frequencies fA and fB can therefore be reliably set at frequencies different from any of the drive frequencies fd1, fd2, and fd3 in the X-axis and Y-axis vibration modes, as shown in FIGS. 4 and 5. For example, the natural vibration frequency characteristics in the X-axis and Y-axis vibration modes have the same tendency, and the natural vibration frequencies fA and fB are readily set at frequencies different from those that fall within the drive frequency range from fmin to fmax. The natural vibration frequencies fA=f3A and fB=f3B are each then set at a frequency that does not coincide with any of the drive frequencies fd1, fd2, and fd3 in the Z-axis vibration mode, as shown in FIG. 6. The natural vibration frequencies can thus each be readily set at a frequency that does not coincide with any of the drive frequencies fd1, fd2, and fd3 in all the X-axis, Y-axis, and Z-axis vibration modes.

In the present embodiment, the first axis is the axis X, which is parallel to the substrate 20, and the second axis is the axis Y, which is parallel to the surfaces of the substrate 20 and perpendicular to the axis X, as shown in FIG. 1. The third axis is the axis Z, which is perpendicular to the surfaces of the substrate 20. The thus set first, second, and third axes allow achievement of a three-axis gyro sensor module capable of detecting angular velocity around the axis X, angular velocity around the axis Y, and angular velocity around the axis Z in FIG. 1.

Figure 7:
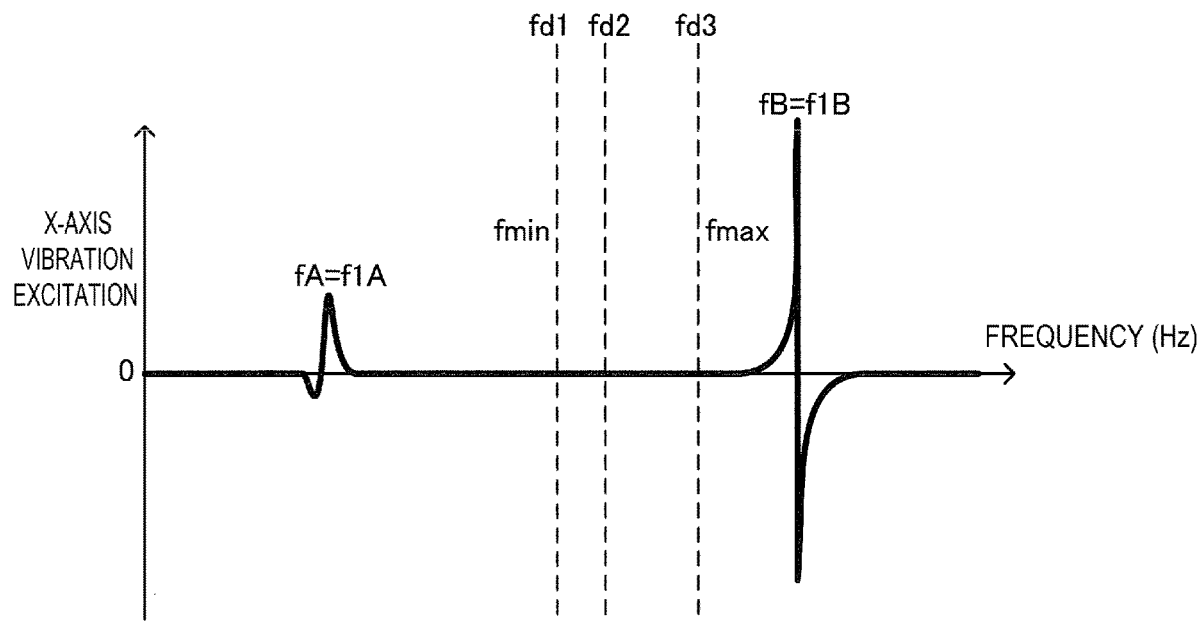
FIG. 7 shows the result of the frequency analysis in the X-axis vibration excitation with the thickness TH of the substrate being TH2.
Figure 8:
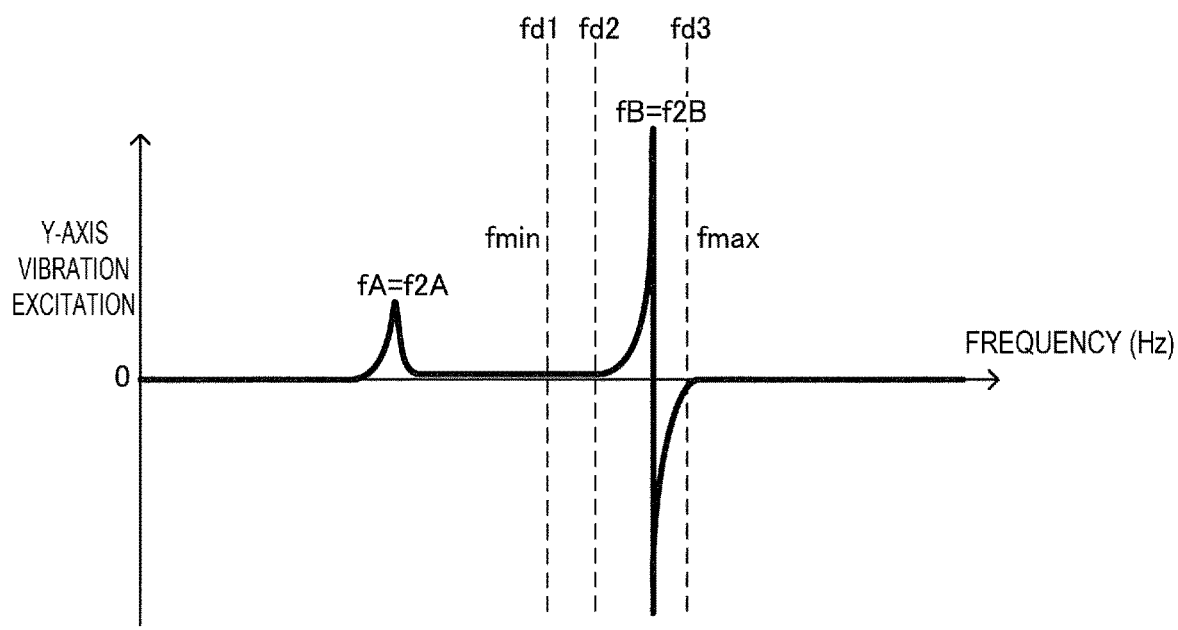
FIG. 8 shows the result of the frequency analysis in the Y-axis vibration excitation with the thickness TH of the substrate being TH2.
Figure 9:
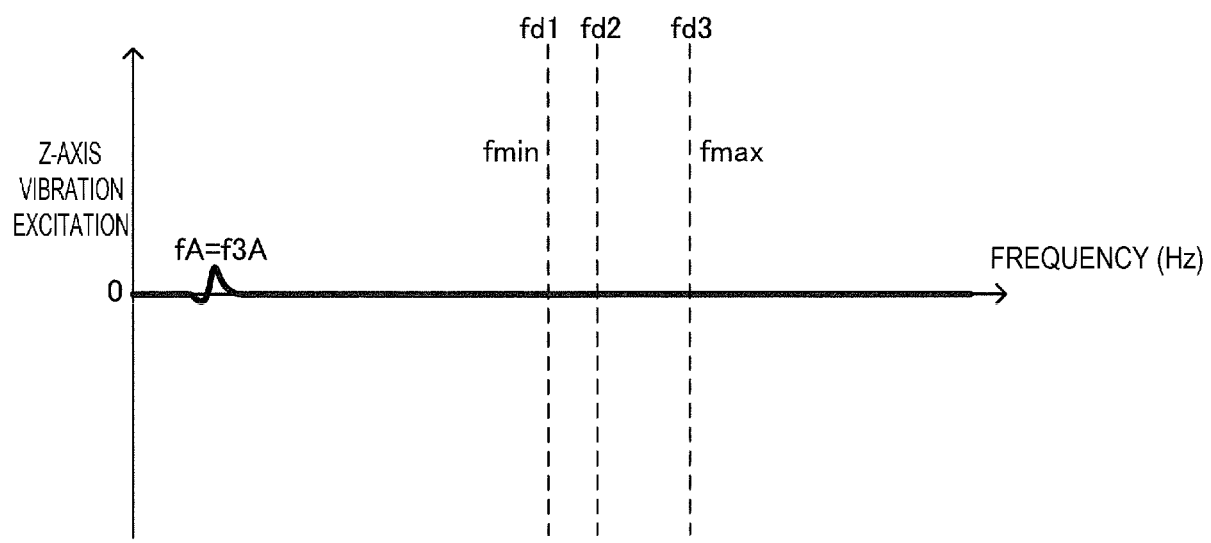
FIG. 9 shows the result of the frequency analysis in the Z-axis vibration excitation with the thickness TH of the substrate being TH2.

FIGS. 7, 8, and 9 show the results of the frequency analysis in the X-axis, Y-axis, and Z-axis vibration modes with the thickness TH of the substrate 20 changed from the value in FIGS. 4, 5, and 6. For example, FIGS. 4 to 6 show the results of the frequency analysis with the thickness TH of the substrate 20 being TH1, whereas FIGS. 7 to 9 show the results of the frequency analysis with the thickness TH of the substrate 20 being TH2>TH1. The thickness TH=TH2 of the substrate 20 in FIGS. 7 to 9 is, for example, a thickness ranging, for example, from 2.1 to 2.3 mm.

Also when the thickness TH of the substrate 20 is TH2, the natural vibration frequencies fA=f1A and fB=f1B of the substrate 20 in the X-axis vibration mode resulting from the X-axis vibration excitation are set at frequencies that each do not coincide with any of the drive frequencies fd1, fd2, and fd3, as shown in FIG. 7. Further, the relationship fA<fmin<fmax<fB is satisfied. The natural vibration frequencies fA=f2A and fB=f2B of the substrate 20 in the Y-axis vibration mode resulting from the Y-axis vibration excitation are also set at frequencies that each do not coincide with any of the drive frequencies fd1, fd2, and fd3, as shown in FIG. 8. The natural vibration frequency fA=f3A of the substrate 20 in the Z-axis vibration mode resulting from the Z-axis vibration excitation is also set at a frequency that does not coincide with any of the drive frequencies fd1, fd2, and fd3, as shown in FIG. 9. The natural vibration frequencies of the substrate 20 are thus each set at a frequency that does not coincide with any of the drive frequencies fd1, fd2, and fd3 in all the X-axis, Y-axis, and Z-axis vibration modes. Therefore, even when the vibration leakage occurs in any of the directions of the detection axes GX, GY, and GZ of the gyro sensors 40X, 40Y, and 40Z, the resonance of the substrate 20 due to the vibration leakage can be avoided.

In the present embodiment, the natural vibration frequencies of the substrate 20 are set based on the thickness TH of the substrate 20 in the direction perpendicular to the substrate 20 in FIG. 1. That is, the thickness TH of the substrate 20 is adjusted to adjust the natural vibration frequencies of the substrate 20 in such a way that the natural vibration frequencies are set at frequencies that each do not coincide with any of the drive frequencies fd1, fd2, and fd3. The adjustment of the natural vibration frequencies based on the thickness TH of the substrate 20 described above allows natural vibration frequency adjustment with no change in the lengths of the edges SD1, SD2, SD3, and SD4 of the substrate 20. Therefore, since the natural vibration frequencies can be adjusted with no change in the planar size of the substrate 20, occurrence of the problems due to the resonance of the substrate 20 resulting from the vibration leakage can be avoided with reduction in the size of the inertial measurement apparatus 10 achieved.

Figure 10:
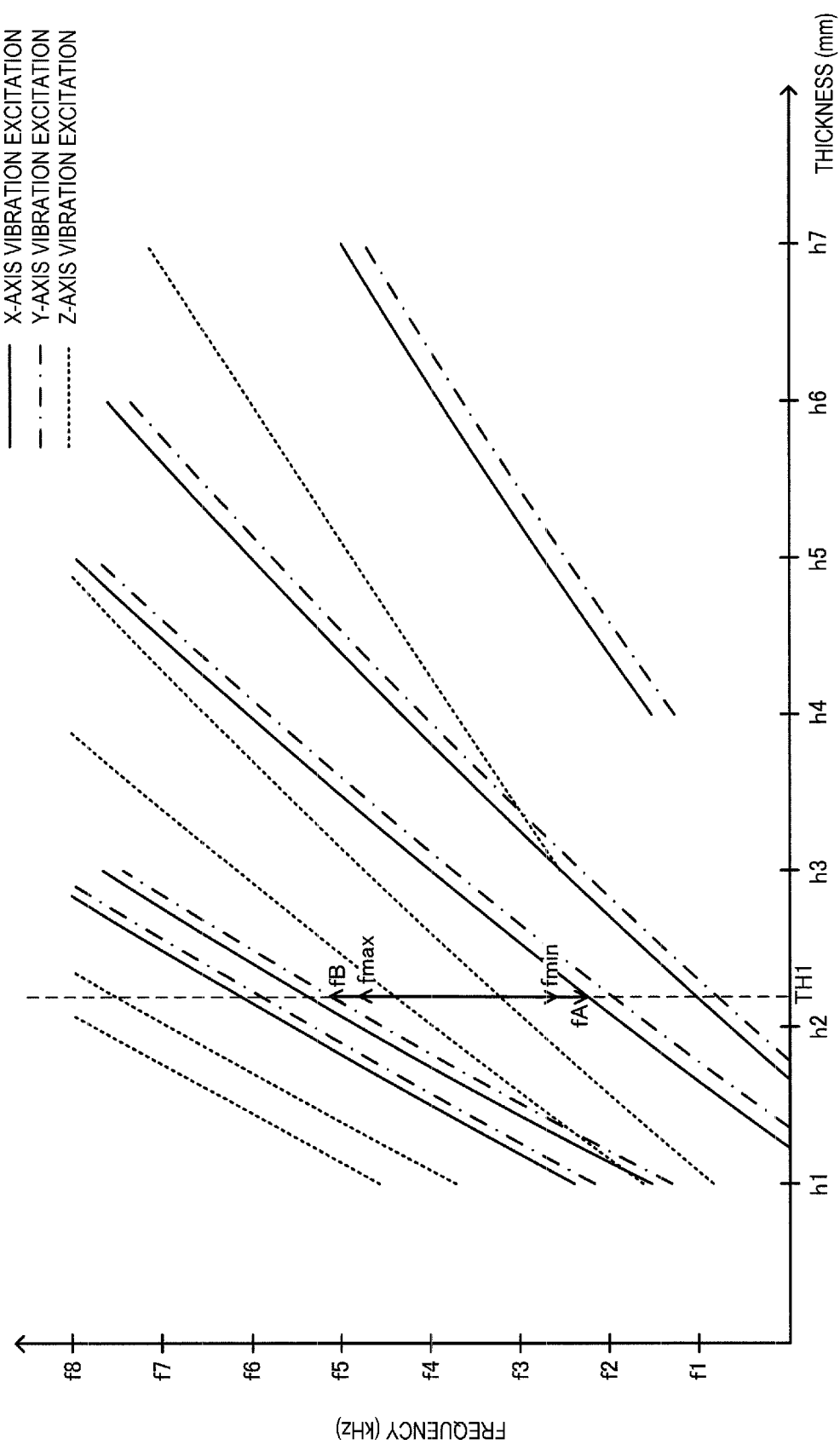
FIG. 10 shows the relationship between the thickness of the substrate and the natural vibration frequencies of the substrate.

FIG. 10 shows the relationship between the thickness TH of the substrate 20 and the natural vibration frequencies of the substrate 20. The natural vibration frequency characteristics in the X-axis vibration mode resulting from the X-axis vibration excitation and the natural vibration frequency characteristics in the Y-axis vibration mode resulting from the Y-axis vibration excitation have the same tendency, as shown in FIG. 10. Therefore, in FIG. 10, the thickness TH of the substrate 20 is first so set that the drive frequency range fmin to fmax falls within the range from fA to fB, which is the range between the adjacent natural vibration frequencies in the X-axis and Y-axis vibration modes. For example, in FIG. 10, setting the thickness TH of the substrate 20 at TH1 allows the drive frequency range fmin to fmax to fall within the range from fA to fB, that is, the relationship fA<fmin<fmax<fB to be satisfied, as described with reference to FIGS. 4 and 5, specifically, the relationship f1A<fmin<fmax<f1B in FIG. 4 and the relationship f2A<fmin<fmax<f2B in FIG. 5 to be satisfied. The natural vibration frequencies in the Z-axis vibration mode are then set at frequencies different from any of fd1, fd2, and fd3 within the frequency range from fA to fB, as shown in FIG. 10. That is, the natural vibration frequencies in the Z-axis vibration mode are set at frequencies different from any of fd1, fd2, and fd3 within the frequency range that satisfies the relationship f1A<fmin<fmax<f1B in FIG. 4 and the relationship f2A<fmin<fmax<f2B in FIG. 5. The natural vibration frequencies can thus be readily each set at a frequency that does not coincide with any of fd1, fd2, and fd3 in all the X-axis, Y-axis, and Z-axis vibration modes.

As described above, in the present embodiment, precise, precise, fine adjustment of the natural vibration frequencies is performed in the Z-axis vibration mode. That is, the drive frequency range from fmin to fmax is so set as to fall within the natural vibration frequency range from fA to fB in the X-axis and Y-axis vibration modes, and then the natural vibration frequencies in the Z-axis vibration mode is precisely adjusted to frequencies different from the drive frequencies fd1, fd2, and fd3, as shown in FIG. 10. The reason for this is as follows: For example, when the thickness TH of the substrate 20 is changed, the natural vibration frequencies of the substrate 20, which are the resonant frequencies thereof, also change, as shown in FIG. 10. For example, the greater the thickness TH, the higher the natural vibration frequencies. The change in the natural vibration frequencies with respect to the change in the thickness TH of the substrate 20 is gentler in the Z-axis vibration mode than in the X-axis and Y-axis vibration modes, as shown in FIG. 10. The Z-axis vibration mode therefore readily ensures an adjustment margin. Further, the displacement of the substrate 20 in a vibration mode in which the substrate 20 resonates is greater in a direction that intersects the principal surface of the substrate 20 than in the in-plane direction of the principal surface, and the resonance of the substrate 20 in the Z-axis vibration mode therefore needs to be reliably avoided. Therefore, in the present embodiment, precise, fine adjustment of the natural vibration frequencies is so performed that the natural vibration frequencies each differ from any of the drive frequencies fd1, fd2, and fd3 in the Z-axis vibration mode. Specifically, the thickness TH of the substrate 20 is so set that the natural vibration frequencies in the Z-axis vibration mode each do not coincide with any of the drive frequencies fd1, fd2, and fd3. Adjustment that allows each of the natural vibration frequency not to coincide with any of the drive frequencies fd1, fd2, and fd3 can thus be achieved with a sufficient adjustment margin provided, whereby the resonance of the substrate 20 in the Z-axis vibration mode can also be reliably avoided.

2. Example of Detailed Configuration

An example of the detailed configuration of the inertial measurement apparatus 10 according to the present embodiment will next be described. FIG. 11 is a plan view showing an example of the detailed configuration of the inertial measurement apparatus 10 according to the present embodiment, and FIG. 12 is a side view of the example of the detailed configuration of the inertial measurement apparatus 10. The inertial measurement apparatus 10 in FIGS. 11 and 12 includes the sensor module 12 and lead groups 60A, 60B, 60C, and 60D. The sensor module 12 includes at least one inertial sensor and the substrate 20, on which the inertial sensor is provided. The lead groups 60A to 60D are provided as a support member for supporting the substrate 20 of the sensor module 12 on an attachment surface. The lead groups 60A to 60D also function as signal terminals that allow the sensor module 12 to input and output signals from and to an external component.

The sensor module 12 is a module part including at least one inertial sensor. In FIGS. 11 and 12, the gyro sensors 40X, 40Y, and 40Z, which are each an angular velocity sensor, and the acceleration sensor 30 are provided as the at least one inertial sensor on the substrate 20, which is a sensor substrate of the sensor module 12.

The inertial measurement apparatus 10 in FIGS. 11 and 12 thus includes the sensor module 12, which includes at least one inertial sensor and the substrate 20, on which the inertial sensor is provided, and the lead groups 60A, 60B, 60C, and 60D, which are provided as the support member for supporting the substrate 20 of the sensor module 12 on the attachment surface 2. The lead groups 60A, 60B, 60C, and 60D also function as a signal terminal group for the sensor module 12. The lead groups 60A, 60B, 60C, and 60D are first, second, third, and fourth lead groups, respectively. The entirety or part of the lead groups 60A, 60B, 60C, and 60D is hereinafter collectively referred to as a lead group 60 as appropriate. Leads 70 of the lead group 60 each have a first section 71, a second section 72, and a third section 73, as shown in FIG. 12.

Figure 13:
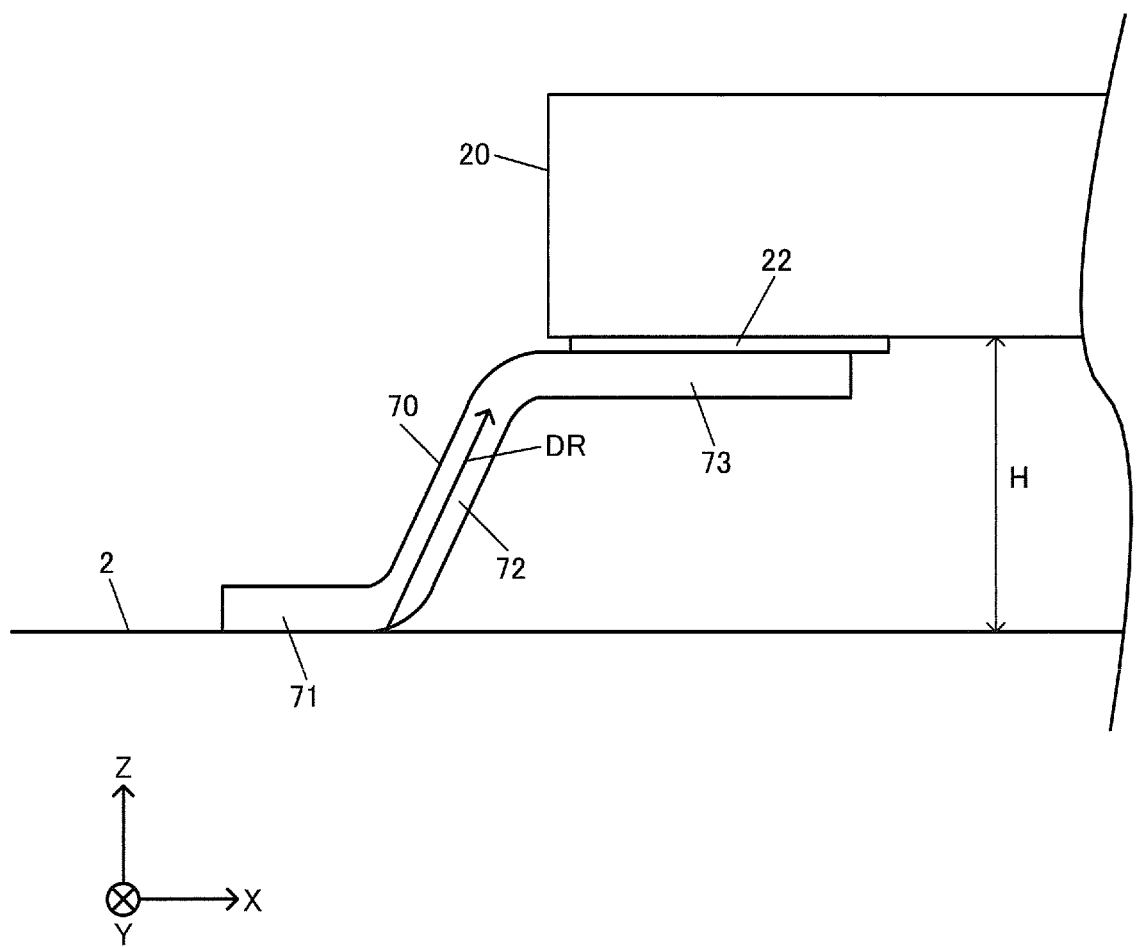
FIG. 13 describes leads that form a support member.

FIG. 13 describes the leads 70, which form the support member, in detail. The leads 70 are formed, for example, by cutting a lead frame at the time of manufacture of the inertial measurement apparatus 10. The leads 70 may be made of an iron-based material or a copper-based material.

The leads 70 each have the first section 71, which is coupled to the attachment surface 2. That is, the first section 71 of each of the leads 70 is a portion cable of being coupled to the attachment surface 2, which is a surface of the attachment target substrate, to which the inertial measurement apparatus 10 is attached. The first section 71 is coupled to a connection terminal formed on the attachment target substrate, for example, by using solder. The attachment target substrate is, for example, a customer substrate used by the customer of the inertial measurement apparatus 10.

The leads 70 each have the second section 72, which extends from the first section 71 toward the substrate 20 in a direction DR, which intersects the attachment surface 2. For example, the direction DR is a direction that inclines with respect to the attachment surface 2 by an acute angle in FIG. 13. The direction DR may instead be perpendicular to the attachment surface 2. The second section 72 of each of the leads 70 is the portion between the first section 71 and a third section 73, for example, a bent portion between the first section 71 and a third section 73.

Figure 18:
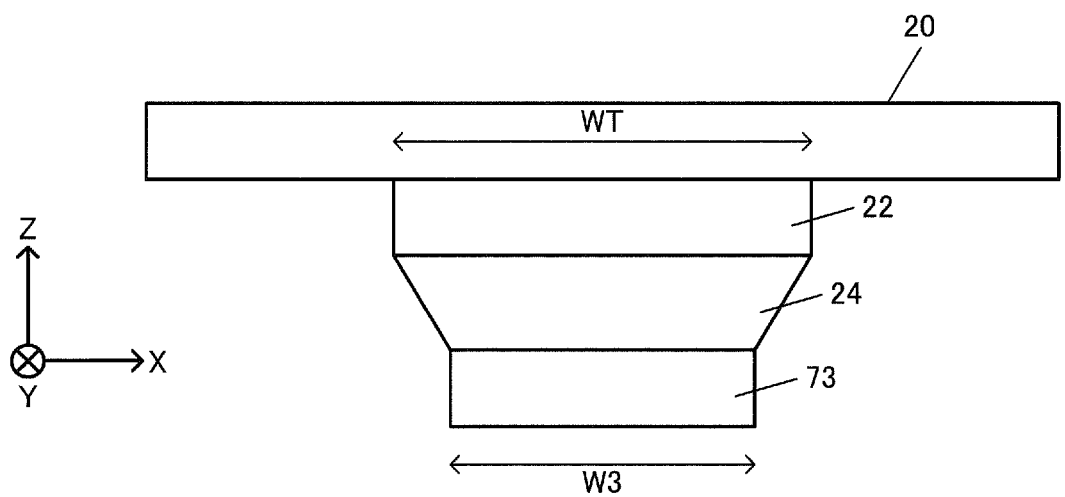
FIG. 18 describes a method for coupling the external connection terminal to the lead by using solder.

The leads 70 each have the third section 73, which is coupled to the substrate 20. Specifically, the third section 73 is coupled to an external connection terminal 22 provided on the bottom surface of the substrate 20. That is, the third section 73 of each of the leads 70 is a portion cable of being coupled to the external connection terminal 22 provided on the bottom surface of the substrate 20. The third section 73 is coupled to the external connection terminal 22 on the substrate 20, for example, by using solder 24, as shown in FIG. 18, which will be described later. Specifically, the third section 73 is coupled to the external connection terminal 22 by using the solder 24, which is high-melting-point solder having a melting point higher than that of the solder used to couple the first section 71. The third section 73 may instead be coupled to the external connection terminal 22 by using a brazing material.

In the present embodiment, the leads 70, which each have the thus configured first section 71, second section 72, and third section 73, are used as the support member to support the substrate 20 of the sensor module 12 at a height H from the attachment surface 2, as shown in FIG. 13. The height H is, for example, at least 1.7 mm.

Figure 14:
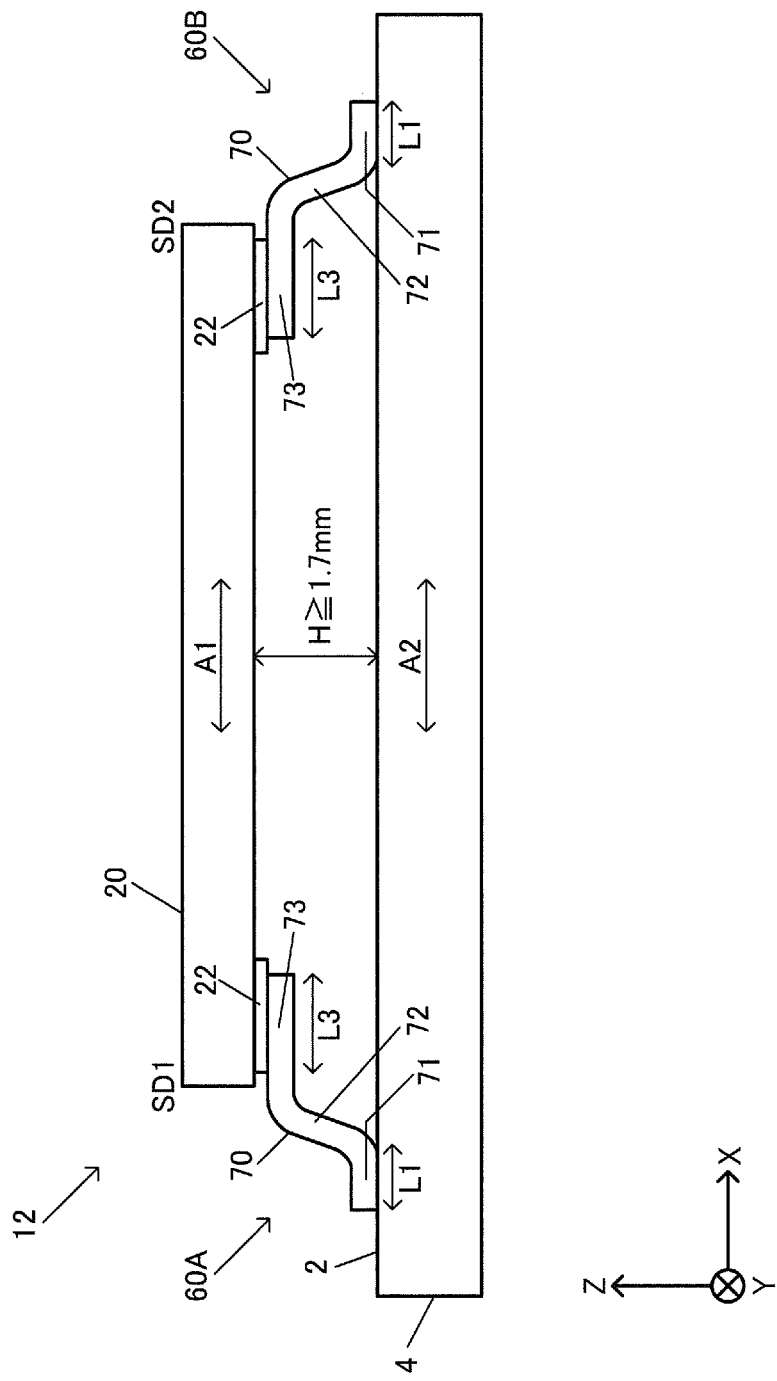
FIG. 14 shows a case where gullwing-type leads are used.
Figure 15:
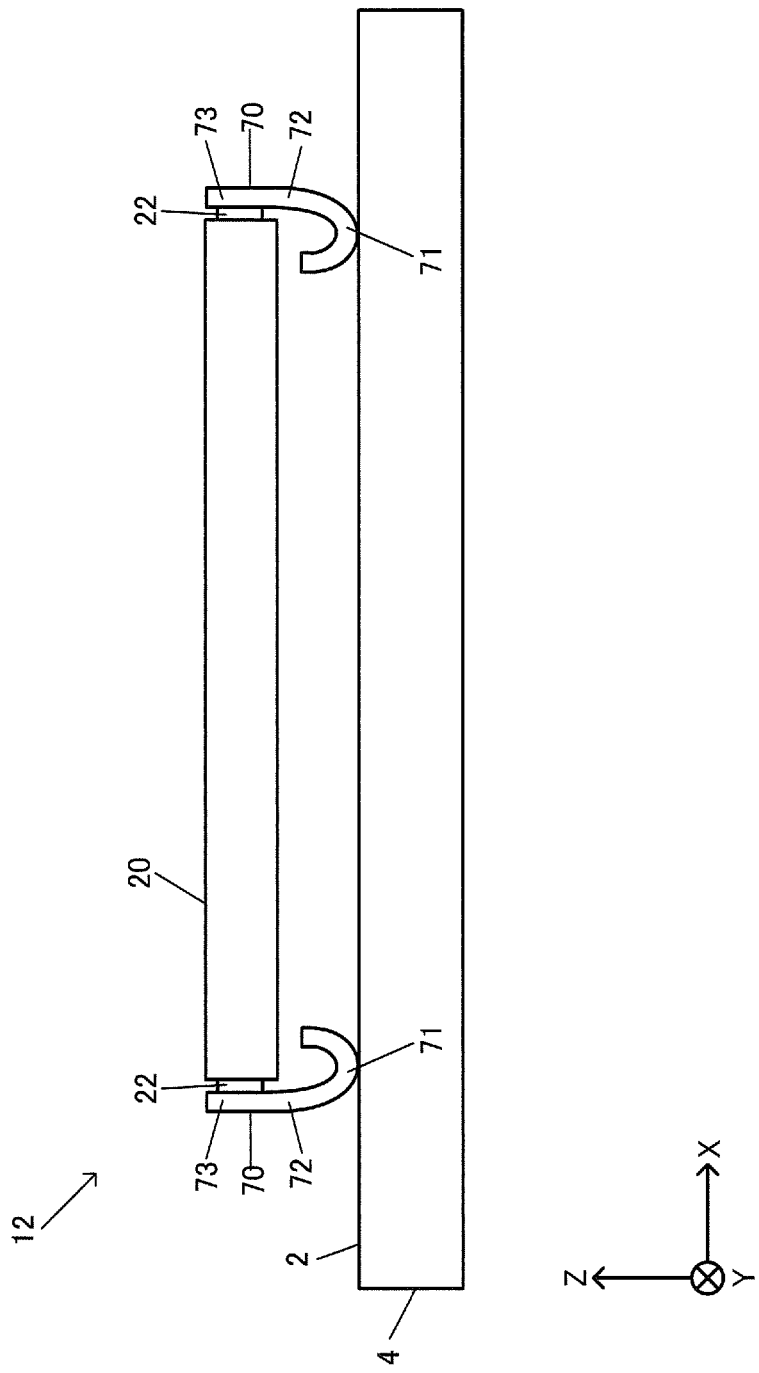
FIG. 15 shows a case where J-lead-type leads are used.
Figure 16:
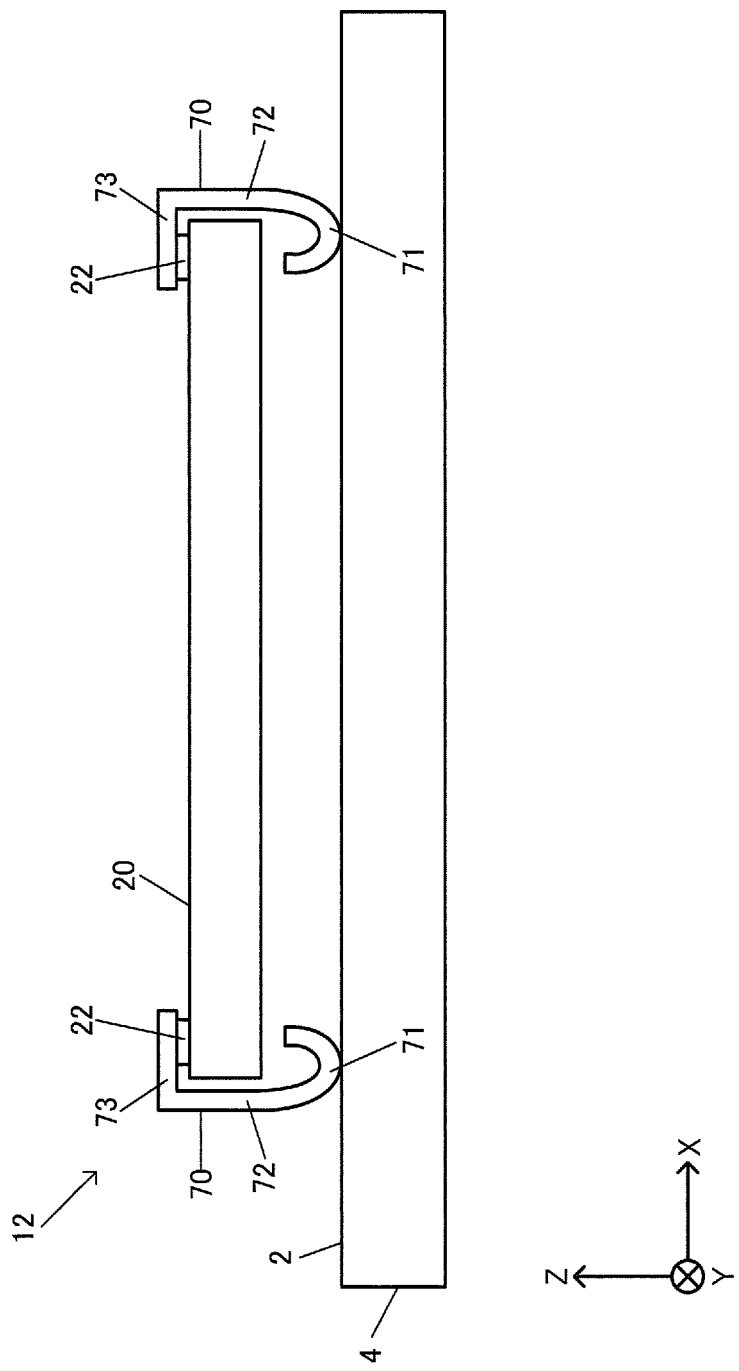
FIG. 16 shows another case where J-lead-type leads are used.

FIG. 14 describes how the leads 70 support the substrate 20 of the sensor module 12. FIG. 14 shows a case where the leads 70 are each a gullwing-type lead. The leads 70 may each instead be a J-lead-type lead, as shown in FIGS. 15 and 16, which will be described later.

In FIG. 14, for example, the leads 70 of the lead group 60A and the leads 70 of the lead group 60B are used as the support member to support the substrate 20 of the sensor module 12 on the attachment surface 2 of the substrate 4. The substrate 4 is, for example, the attachment target substrate to which the inertial measurement apparatus 10 is attached, for example, a customer substrate.

For example, the inertial measurement apparatus 10 in related art has not employed a method for directly mounting the substrate 20, on which an inertial sensor is mounted, on the substrate 4, such as a customer substrate. The inertial measurement apparatus 10 is electrically coupled to an external apparatus, for example, by providing the sensor module 12 with a male connector, coupling a female connector at one end of a cable to the mail connector, and coupling the other end of the cable to the external apparatus via a connector or any other component. The result of the measurement performed by the inertial measurement apparatus 10 is then outputted to the external apparatus via the cable.

The cable-based coupling described above is, however, not preferable from the viewpoint of reliability, and coupling using, for example, solder is required, for example, in an in-vehicle instrument. It is therefore desired to directly mount the substrate 20 of the sensor module 12 onto the substrate 4, which is a customer substrate.

The coefficient of linear expansion of the substrate 20, however, differs from the coefficient of linear expansion of the substrate 4, for example, in FIG. 14. For example, since the substrate 4 is a substrate used by the customer, a variety of types of substrate are used in accordance with the customer. It is therefore difficult to achieve a state in which the coefficients of linear expansion of the substrates 20 and 4 are equal to each other. When the coefficients of linear expansion differ from each other, the displacement of the substrate 20, for example, in a direction A1 and the displacement of the substrate 4, for example, in a direction A2 due, for example, to heat undesirably differ from each other. Stress is therefore induced, for example, in the substrate 20 of the sensor module 12 due to the difference in the coefficient of linear expansion between the substrates 20 and 4, and the sensor characteristics of the inertial sensor undesirably deteriorate. For example, in the case of a MEMS (micro electro mechanical systems) capacitance-type acceleration sensor, the stress induced in the substrate 20 by the difference in the coefficient of linear expansion changes the capacitance, resulting in a problem of deterioration of the sensor characteristics of the acceleration sensor. Further, another problem occurs with the gyro sensors, such as a shift of the detection axes thereof, resulting in deterioration of the sensor characteristics of the gyro sensors.

As a method used in Comparative Example of the present embodiment, it is conceivable to employ, for example, a method for coupling the substrate 20 to the substrate 4 by using a ball grid array (BGA). The method, however, does not allow the BGA coupling portion to absorb the stress induced by the difference in the coefficient of linear expansion. The stress is therefore induced in the substrate 20, resulting in deterioration of the sensor characteristics of the inertial sensor. Further, the stress acting on the BGA junction causes the solder to crack or otherwise break, resulting in deterioration of the solder mounting reliability.

To solve the problems described above, the inertial measurement apparatus 10 having the detailed configuration example of the present embodiment includes the sensor module 12, which includes at least one inertial sensor and the substrate 20, on which the inertial sensor is provided, and the lead group 60, which is provided as the support member for supporting the substrate 20 of the sensor module 12 on the attachment surface 2. The lead group 60 is formed, for example, of the lead groups 60A to 60D. The leads 70 of the lead group 60 each have the first section 71, which is coupled to the attachment surface 2, the second section 72, which extends from the first section 71 toward the substrate 20 in the direction DR, which intersects the attachment surface 2, and the third section 73, which is coupled to the substrate 20, as described with reference to FIGS. 13 and 14.

According to the thus configured inertial measurement apparatus 10, the lead group 60, which functions as the support member, can be used to support the substrate 20 of the sensor module 12, in which the inertial sensor, such as the acceleration sensor 30 and the gyro sensors 40X, 40Y, and 40Z, is provided. Further, using the lead group 60 as the signal terminal group allows signal communication between the sensor module 12 and the external apparatus. The leads 70 of the lead group 60 each have the first section 71, which is coupled to the attachment surface 2, the third section 73, which is coupled to the substrate 20, and the second section 72, which is the portion between the first section 71 and the third section 73 and extends toward the substrate 20 in the direction DR. Therefore, even when the coefficient of linear expansion of the substrate 4, for example, a customer substrate, differs from the coefficient of linear expansion of the substrate 20 of the sensor module 12, the lead group 60 can absorb and reduce the stress induced by the difference in the coefficient of linear expansion. That is, the second section 72 of each of the leads 70 of the lead group 60 is deformed and distorted to reduce the stress induced in the substrate 20. Deterioration of the sensor characteristics of the inertial sensor due to the stress resulting from the difference in the coefficient of linear expansion can therefore be suppressed. For example, the mounting reliability of the solder deteriorates by a greater amount as larger stress acts on the solder. However, according to the present embodiment, the stress acting on the solder can be reduced, whereby deterioration of the solder mounting reliability can be suppressed. The inertial measurement apparatus 10 can therefore be so provided that the sensor module 12 including an inertial sensor can be appropriately mounted with deterioration of the sensor characteristics of the inertial sensor and deterioration of the mounting reliability resulting from the difference in the coefficient of linear expansion suppressed.

The inertial measurement apparatus 10 further includes, as the lead group 60, the lead group 60A, which is provided in correspondence with the edge SD1 of the substrate 20, and the lead group 60B, which is provided in correspondence with the edge SD2 of the substrate 20, which is the edge facing the edge SD1. The lead group 60A forms the first lead group, the lead group 60B forms the second lead group, the edge SD1 is the first edge, and the edge SD2 is the second edge. The inertial measurement apparatus 10 according to the present embodiment thus includes at least the lead group 60A, which is provided in correspondence with the edge SD1 of the substrate 20, and the lead group 60B, which is provided in correspondence with the edge SD2 of the substrate 20, which is the edge facing the edge SD1. Therefore, the lead group 60A can support the edge SD1 of the substrate 20, and the lead group 60B can support the edge SD2 of the substrate 20. Even when stress is induced in the direction, for example, from the edge SD1 toward the edge SD2 due to the difference in the coefficient of linear expansion, the second section 72 of each of the leads 70 of the lead groups 60A and 60B provided in correspondence with the edges SD1 and SD2 is deformed and distorted to reduce the stress induced in the substrate 20. Deterioration of the sensor characteristics and deterioration of the mounting reliability resulting from the difference in the coefficient of linear expansion can therefore be effectively suppressed.

The inertial measurement apparatus 10 further includes, as the lead group 60, the lead group 60C, which is provided in correspondence with the edge SD3 of the substrate 20, which is the edge that intersects the edges SD1 and SD2, and the lead group 60D, which is provided in correspondence with the edge SD4 of the substrate 20, which is the edge facing the edge SD3. The lead group 60C forms the third lead group, the lead group 60D forms the fourth lead group, the edge SD3 is the third edge, and the edge SD4 is the fourth edge. The inertial measurement apparatus 10 according to the present embodiment thus includes the lead groups 60A, 60B, 60C, and 60D provided in correspondence with the edges SD1, SD2, SD3, and SD4. The lead groups 60A, 60B, 60C, and 60D can thus support the locations of the substrate 20 that correspond to the four edges SD1, SD2, SD3, and SD4. Even when stress is induced in the substrate 20, for example, in the direction from the edge SD1 toward the edge SD2 or in the direction from the edge SD3 toward the edge SD4 due to the difference in the coefficient of linear expansion, the second section 72 of each of the leads 70 of the lead groups 60A, 60B, 60C, and 60D provided in correspondence with the edges SD1, SD2, SD3, and SD4 is distorted to reduce the stress. Deterioration of the sensor characteristics and deterioration of the mounting reliability due to the stress resulting from the difference in the coefficient of linear expansion can therefore be effectively suppressed. In FIG. 11, the lead groups 60A, 60B, 60C, and 60D are provided at the locations of the substrate 20 that correspond to all the edges SD1, SD2, SD3, and SD4, and the lead groups may instead be provided at locations corresponding to at least two of the edges.

A gullwing-type lead can be used as each of the leads 70, as shown in FIG. 14. In this case, the first section 71 of each of the leads 70 extends in the direction away from the substrate 20 along the plane direction of the attachment surface 2. The third section 73 of each of the leads 70 is coupled to a second surface of the substrate 20 that is the surface opposite a first surface on which the inertial sensor is provided. Specifically, the third section 73 of each of the leads 70 is coupled to the external connection terminal 22 formed on the second surface, which is the bottom surface of the substrate 20, for example, by using solder, for example, high-melting-point solder, or by using a brazing material. The external connection terminals 22 are mounting pads and are metal electrodes. Using the leads 70 each formed of a gullwing-type lead allows the second section 72 of each of the gullwing-type leads 70 to be deformed or otherwise changed to reduce the stress resulting from the difference in the coefficient of linear expansion, whereby deterioration of the sensor characteristics and deterioration of the mounting reliability can be suppressed. As a variation, the third section 73 of each of the gullwing-type leads 70 in FIG. 14 can be coupled to the first surface of the substrate 20, which is the upper surface thereof, or the side surface of the substrate 20. That is, the third section 73 is coupled to the external connection terminal 22 formed on the first surface or the side surface. The third section 73 extends along the plane direction of the surface to which the third section 73 is coupled.

The leads 70 may each be a J-lead-type lead, which is a bent lead having a J-letter-like shape, as shown in FIGS. 15 and 16. In this case, the tip of the first section 71 of each of the leads 70 extends toward the substrate 20 in a direction that intersects the attachment surface 2. The third section 73 of each of the J-lead-type leads 70 is coupled to the side surface of the substrate 20 in FIG. 15 or coupled to the first surface of the substrate 20, which is the upper surface thereof in FIG. 16. That is, the third section 73 of each of the leads 70 is coupled to the external connection terminal 22 formed on the side surface or the first surface of the substrate 20. Using the thus configured J-lead-type leads 70 allows the second section 72 of each of the J-lead-type leads 70 to be deformed or otherwise changed to reduce the stress resulting from the difference in the coefficient of linear expansion, whereby deterioration of the sensor characteristics and deterioration of the mounting reliability can be suppressed.

Figure 17:
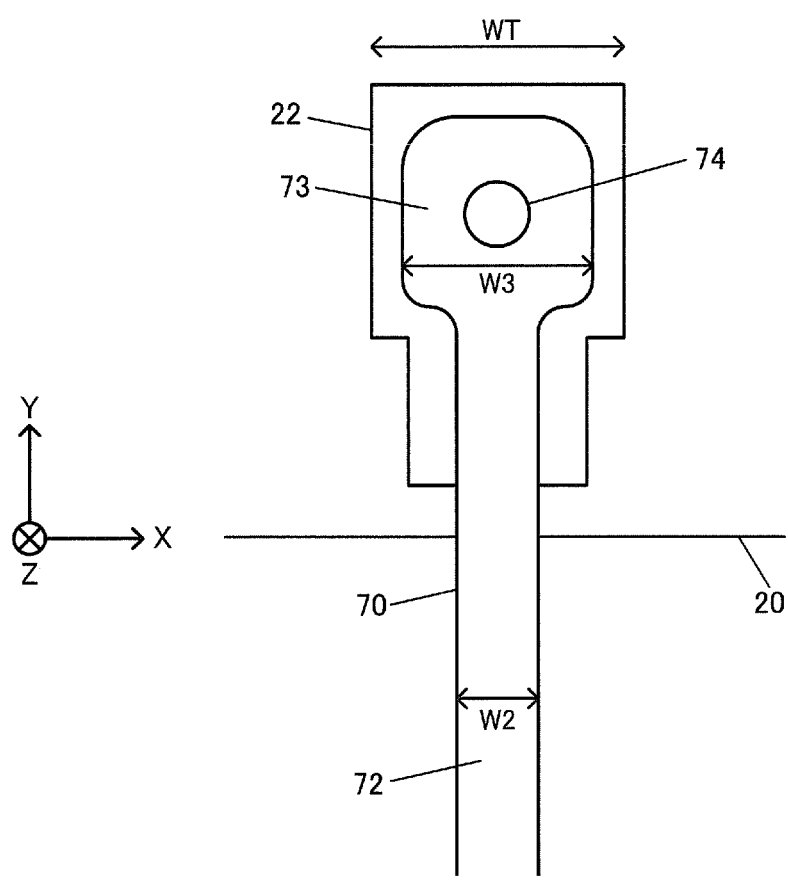
FIG. 17 describes the arrangement of an external connection terminal on a substrate and a lead.

The arrangement of each of the external connection terminals 22 on the substrate 20 and the corresponding lead 70 will next be described with reference to FIG. 17. FIG. 17 is a plan view viewed along the direction perpendicular to the bottom surface of the substrate 20 that is the surface on which the external connection terminals 22 are provided. That is, FIG. 17 is a plan view viewed along the Z-axis direction. In the plan view of FIG. 17, a width WT of the external connection terminal 22 is greater than a width W3 of the third section 73 of the lead 70. The width W3 is a width in a direction perpendicular to the direction in which the lead 70 extends. For example, in the plan view of FIG. 17, the third section 73 of the lead 70 is so coupled to the external connection terminal 22 on the substrate 20 that the external connection terminal 22 contains the third section 73. The mounting reliability of the connection between the external connection terminal 22 on the substrate 20 and the third section 73 of the lead 70 can thus be improved. For example, when the third section 73 is coupled to the external connection terminal 22 with the solder 24, as shown in FIG. 18, which will be described later, the mounting reliability of the solder can be improved.

A hole 74 is provided in the third section 73 of the lead 70, as shown in FIG. 17. That is, the hole 74, which is a through hole, is formed. Providing the hole 74 can, for example, increase the mounting area over which the third section 73 is coupled to the external connection terminal 22, and the mounting volume of the solder 24 can be increased accordingly, whereby the mounting reliability can be further improved. That is, solder connection is present not only in the portion where the external connection terminal 22 is bonded to the third section 73 but in the hole 74, whereby more robust, reliable connection is achieved. One hole 74 is provided in FIG. 17, and a plurality of holes may be provided.

The width W3 of the third section 73 of the lead 70 is larger than a width W2 of the second section 72, as shown in FIG. 17. The larger width W3 of the third section 73 allows an increase in the area over which the third section 73 is coupled to the external connection terminal 22 on the substrate 20. The mounting volume of the solder 24 at the portion where the third section 73 is bonded to the external connection terminal 22 thus increases, whereby the third section 73 of the lead 70 can be coupled to the external connection terminal 22 with high reliability. Further, the smaller width W2 of the lead 70 allows the lead group 60 to be readily routed.

The corners of the third section 73 of the lead 70 are so rounded, as shown in FIG. 17, as not to cause stress concentration. That is, the sharp corners are chamfered into rounded corners. As a result, the solder 24 is unlikely to crack even when stress acts on the solder 24, whereby the mounting reliability can be further improved.

Figure 19:
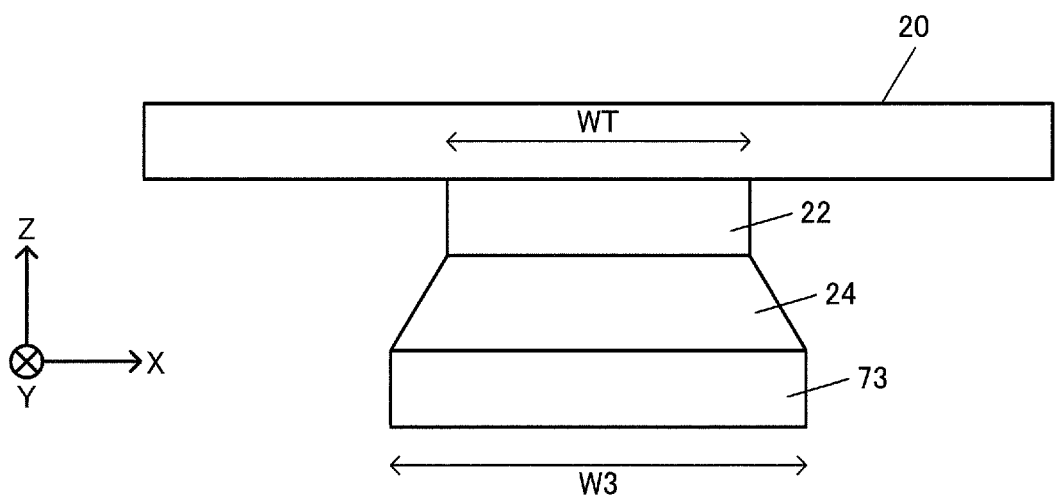
FIG. 19 describes another method for coupling the external connection terminal to the lead by using solder.

In the present embodiment, the third section 73 of the lead 70 is coupled to the external connection terminal 22 on the substrate 20 with the solder 24. For example, FIG. 18 is a side view of the portion where the third section 73 of the lead 70 is bonded to the external connection terminal 22. That is, FIG. 18 is a side view viewed along the Y-axis direction. The third section 73 of the lead 70 is coupled to the external connection terminal 22 on the substrate 20 with the solder 24, as shown in FIG. 18. In FIG. 18, the width WT of the external connection terminal 22 is larger than the width W3 of the third section 73. The solder 24 at the portion where the third section 73 is bonded to the external connection terminal 22 therefore has a fillet-like shape, whereby the mounting reliability of the solder can be improved. As a variation, the width WT of the external connection terminal 22 can be smaller than the width W3 of the third section 73, as shown in FIG. 19. The mounting method described above also allows fillet-shaped solder 24, whereby the mounting reliability of the solder can be improved. The method in FIG. 19 prevents the fillet-shaped solder 24 from extending off the outer shape of the substrate 20, minimizing the formed lead group 60, whereby the product size of the inertial measurement apparatus 10 can be reduced.

In the present embodiment, since the external connection terminals 22 on the substrate 20 are fixed to the third sections 73 of the leads 70 with the solder 24, the reliability of the coupling at the portions where the third sections 73 are bonded to the external connection terminals 22 can be ensured. For example, the third sections 73 can be more securely coupled to the external connection terminals 22 with the solder 24 with higher reliability, whereby proper signal transmission between the sensor module 12 and an external component via the external connection terminals 22 and the leads 70 can be achieved.

The first sections 71 of the leads 70 are coupled to connection terminals on the substrate 4, such as a customer substrate, by using solder. In this process, the solder coupling is performed by using reflowing in many cases. The first sections 71 of the leads 70 are coupled to the connection terminals on the substrate 4, for example, by printing solder paste onto lands that are the connection terminals on the substrate 4, mounting the sensor module 12 on the substrate 4, and melting the solder by using the heat generated by the reflowing. In this case, the heat generated by the reflowing could undesirably also melt the solder 24 that couples the third sections 73 of the leads 70 to the external connection terminals 22 on the substrate 20.

To avoid the problem described above, the third sections 73 of the leads 70 are coupled to the external connection terminals 22 with the high-melting-point solder 24 in the present embodiment. For example, the third sections 73 are coupled to the external connection terminals 22 with solder 24 having a melting point higher than 220 degrees. As a result, even when the first sections 71 of the leads 70 are coupled by reflowing to the connection terminals on the substrate 4 with solder, the situation in which the heat generated by the reflowing melts the solder 24 at the portions where the third sections 73 are bonded to the external connection terminals 22 can be avoided. A problem with the coupling between the lead group 60 and the sensor module 12 can therefore be avoided when the inertial measurement apparatus 10 is assembled onto a customer substrate.

FIG. 20 shows an example of the high-melting-point solder. The high-melting-point solder having the melting point higher than 220 degrees is, for example, Sn—Sb-based solder, which is an alloy of tin and antimony, as shown in FIG. 20. Sn—Sb-based solder can achieve high-melting-point solder having a melting point of 240° C. or higher or 245° C. or higher, which is solder having a melting point higher than that of typical solder, for example, Sn—Pb-based solder, which is an alloy of tin and lead. Therefore, even when the first sections 71 of the leads 70 are coupled to the connection terminals on the substrate 4 with Sn—Pb-based solder by using reflowing, coupling the third sections 73 of the leads 70 to the external connection terminals 22, for example, with Sn—Sb-based high-melting-point solder 24 can avoid the problem with the coupling between the lead group 60 and the sensor module 12 from occurring when the inertial measurement apparatus 10 is assembled onto a customer substrate.

The high-melting-point solder having the melting point higher than 220 degrees is not limited to Sn—Pb-based solder and can be any of a variety of other types of solder, such as Sn—Ag-based solder, which is an alloy of tin and silver, and Sn—Cu-based solder, which is an alloy of tin and copper.

The third sections 73 of the leads 70 may be coupled to the external connection terminals 22 on the substrate 20 with a brazing material. According to brazing using a brazing material, the brazing material, which is an alloy having a melting point lower than that of a base material that is a member to be bonded, can be melted to bond a plurality of members to each other without the base material itself melted. Examples of the brazing material may include gold, silver, and copper brazing materials, and the melting points thereof are higher than or equal to 800° C. or higher than or equal to 600° C., as shown in FIG. 20. Therefore, even when the first sections 71 of the leads 70 are coupled by reflowing to the connection terminals on the substrate 4 with solder, coupling the third sections 73 of the leads 70 to the external connection terminals 22 with a brazing material can avoid the problem with the coupling between the lead group 60 and the sensor module 12 from occurring when the inertial measurement apparatus 10 is assembled onto a customer substrate.

Figure 21:
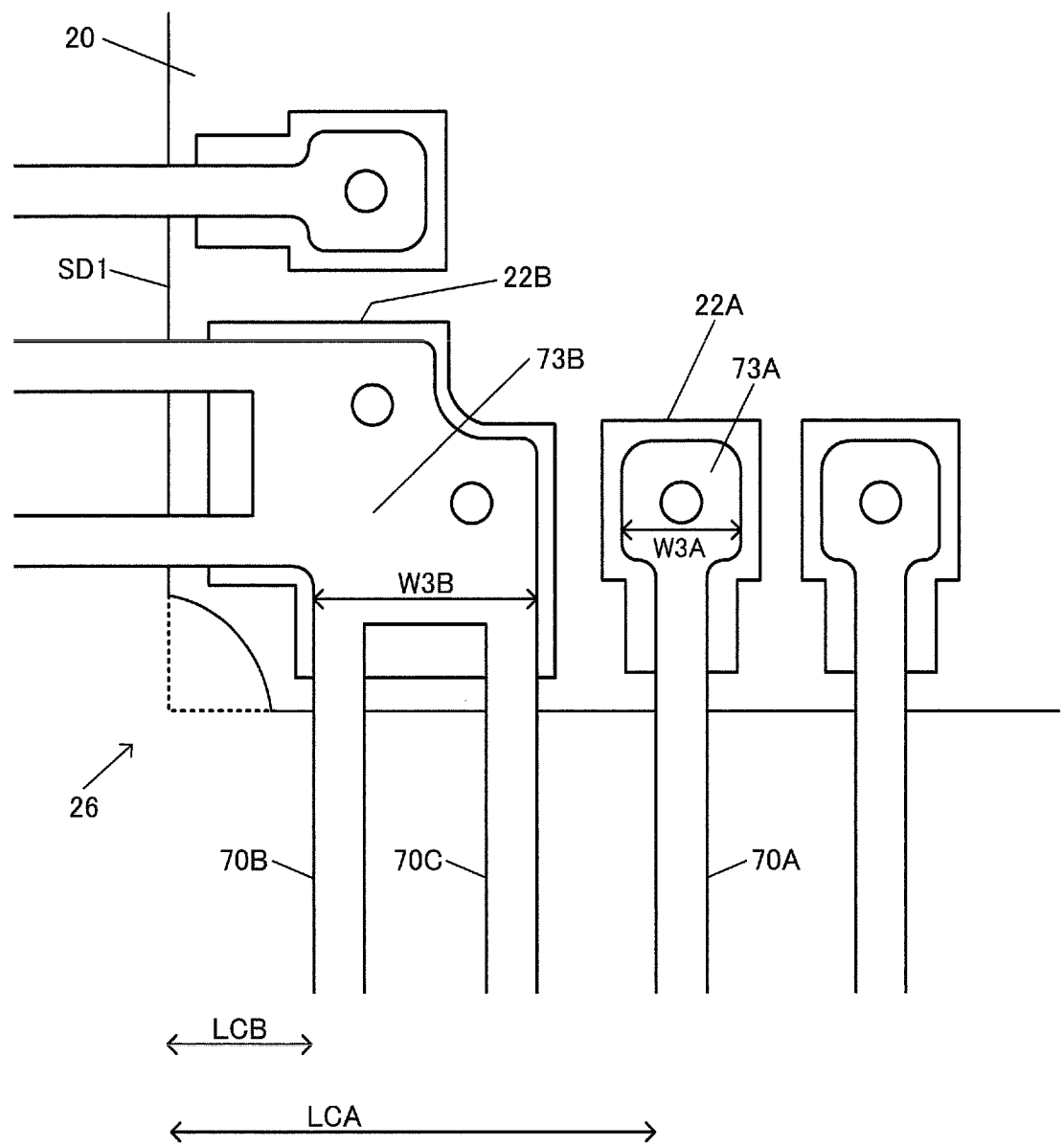
FIG. 21 describes a detailed example of the coupling between the external connection terminals on the substrate and the leads.

FIG. 21 shows a detailed example of the coupling between the external connection terminals 22 on the substrate 20 and the leads 70. For example, the lead group 60 in the present embodiment includes a lead 70A and a lead 70B. The lead 70A is a first lead, and the lead 70B is a second lead. A third section 73A of the lead 70A is coupled to an external connection terminal 22A on the substrate 20, and a third section 73B of the lead 70B is coupled to an external connection terminal 22B on the substrate 20. A width W3B of the third section 73B of the lead 70B, which is the second lead, is greater than a width W3A of the third section 73A of the lead 70A, which is the first lead, as shown in FIG. 21.

For example, in FIG. 21, the lead 70B is coupled to a location close to the edge SD1, which forms the outer shape of the substrate 20. Large stress therefore acts on the portion where the third section 73B of the lead 70B is bonded to the external connection terminal 22B as compared with the stress acting on the portion where the third section 73A of the lead 70A is bonded to the external connection terminal 22A, so that the solder is likely to crack or otherwise break. To avoid the problem described above, in FIG. 21, the third section 73B of the lead 70B has a larger width W3B and is therefore coupled to the external connection terminal 22 over a greater mounting area. Increasing the mounting area as described above increases the solder mounting volume to allow improvement in the mounting reliability at the portion where the third section 73B of the lead 70B is bonded to the external connection terminal 22B.

In FIG. 21, the lead group 60 further includes a lead 70C. The lead 70C is a third lead. The lead 70C adjacent to the lead 70B and having the same potential as that at the lead 70B is coupled to the third section 73B of the lead 70B. That is, the third section 73B is shared by the two leads 70B and 70C and set at the same potential, for example, GND. The third section 73B shared by the two leads 70B and 70C can therefore be used to couple the leads 70B and 70C to the external connection terminal 22B on the substrate 20, for example, with the solder 24. The mounting area is therefore increased, and the solder mounting volume increases accordingly, whereby the mounting reliability at the portion where the third section 73B is bonded to the external connection terminal 22B can be improved.

In FIG. 21, a distance LCB from a corner 26 of the substrate 20 to the lead 70B is smaller than a distance LCA from the corner 26 of the substrate 20 to the lead 70A. For example, it is believed that the difference in the coefficient of linear expansion causes large stress to be induced at the corner 26 of the substrate 20 as compared with the stress induced at the other locations in the substrate 20. The reason for this is that stress in the direction from the edge SD1 to the edge SD2 of the substrate 20 and stress in the direction from the edge SD3 to the edge SD4 of the substrate 20, for example, are both induced at the corner 26. In the configuration in which the lead group 60 supports the sensor module 12, as in the present embodiment, the stress can be reduced, but the mounting reliability could undesirably decrease due to residual stress. In this regard, the third section 73B of the lead 70B, the distance LCB from which to the corner 26 is small, has the large width W3B, and the area where the third section 73B is mounting on the external connection terminal 22B increases accordingly in FIG. 21. The width W3B of the third section 73B is therefore increased, and the solder mounting volume increases accordingly, whereby the mounting reliability at the portion where the third section 73B is bonded to the external connection terminal 22B can be improved, and breakage of the bonded portion due, for example, to cracking of the solder can be avoided even when large stress acts on the third section 73B, which is located in the vicinity of the corner 26 of the substrate 20.

Further, in the present embodiment, the height H of the lead group 60 in the side view of the substrate 20 is desirably at least 1.7 mm, as shown in FIG. 14. The height H is smaller than the overall length of each of the leads 70. That is, the height H is smaller than the overall length of each of the straightened gullwing-type leads 70 shown in FIG. 19.

The substrate 20 is a ceramic substrate, and the inertial sensor is an inertial sensor accommodated in a ceramic package, as described above. For example, a ceramic substrate, such as a glass ceramic substrate and an alumina ceramic substrate, is used as the substrate 20. The inertial sensor, such as the gyro sensors 40X, 40Y, and 40Z and the acceleration sensor 30 in FIGS. 11 and 12, is an inertial sensor accommodated in a ceramic package. That is, an inertial sensor device that is a gyro sensor device or an acceleration sensor device is accommodated in a ceramic package. As an example, the ceramic package includes a container and a lid made of ceramic, and an inertial sensor device is accommodated in an accommodation space formed by the container and the lid hermetically bonded to each other. For example, the bottom surface or the side surface of the ceramic container is then attached to the substrate 20. The inertial sensor is thus mounted on the substrate 20. When the package of each inertial sensor is made of a ceramic material, as described above, using a ceramic substrate as the substrate 20 allows the difference in the coefficient of linear expansion between the package of the inertial sensor and the substrate 20 to be reduced to a sufficiently small value. Deterioration of the detection characteristics of each inertial sensor and a decrease in the reliability of mounting the inertial sensor on the substrate 20 due to the stress resulting from the difference in the coefficient of linear expansion can therefore be suppressed.

In the present embodiment, the substrate 20 may be a resin substrate, the inertial sensor may be an inertial sensor accommodated in a ceramic package, and the difference in the coefficient of linear expansion between the resin substrate and the ceramic package may be smaller than or equal to 30%. The difference in the coefficient of linear expansion between the package of the inertial sensor and the substrate 20 can thus be sufficiently small. Deterioration of the detection characteristics of the inertial sensor and a decrease in the reliability of mounting the inertial sensor on the substrate 20 due to the stress resulting from the difference in the coefficient of linear expansion can therefore be suppressed.

3. Electronic Instrument and Moving Object

Figure 22:
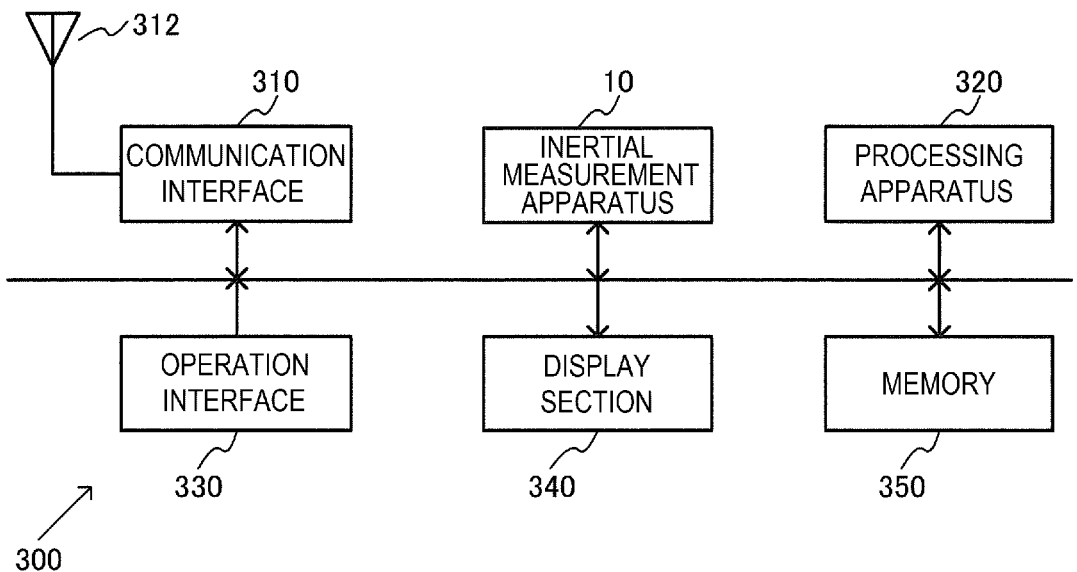
FIG. 22 shows an example of the configuration of an electronic instrument according to the embodiment.

FIG. 22 is a block diagram showing an example of the configuration of an electronic instrument 300 according to the present embodiment. The electronic instrument 300 includes the inertial measurement apparatus 10 according to the present embodiment and a processing apparatus 320, which carries out processes based on the result of the measurement performed by the inertial measurement apparatus 10. The electronic instrument 300 can further include a communication interface 310, an operation interface 330, a display section 340, a memory 350, and an antenna 312.

The communication interface 310 is, for example, a wireless circuit and receives data from an external component and transmits data to the external component via the antenna 312. The processing apparatus 320 controls the electric instrument 300 and performs a variety of types of digital processing on the data transmitted and received via the communication interface 310. The processing apparatus 320 performs the variety of types of processing based on the result of the measurement performed by the inertial measurement apparatus 10. Specifically, the processing apparatus 320 performs signal processing, such as correction and filtering of an output signal that is the result of the measurement performed by the inertial measurement apparatus 10 or performs a variety of types of control on the electronic instrument 300 based on the output signal. The functions of the processing apparatus 320 can be achieved by a processor, for example, an MPU and a CPU. The operation interface 330 allows a user to perform input operation and can be achieved, for example, by operation buttons or a touch panel display. The display section 340 displays a variety of pieces of information and can be achieved, for example, by a display using a liquid crystal or organic EL material. The memory 350 stores data, and the functions of the memory 350 can be achieved, for example, by a semiconductor memory, such as a RAM and a ROM.

The electronic instrument 300 according to the present embodiment can be used as a variety of instruments, for example, an in-vehicle instrument, a video-related instrument, such as a digital still camera and a video camcorder, a wearable instrument, such as a head mounted display and a timepiece-related instrument, an inkjet-type discharge apparatus, a robot, a personal computer, a mobile information terminal, a printing apparatus, a projection apparatus, a medical instrument, and a measurement instrument. The in-vehicle instrument is, for example, a car navigator and an automatic driving instrument. The timepiece-related instrument is, for example, a timepiece and a smartwatch. The inkjet discharge apparatus is, for example, an inkjet printer. The mobile information terminal is, for example, a smartphone, a mobile phone, a mobile game console, a laptop PC, or a tablet terminal.

Figure 23:
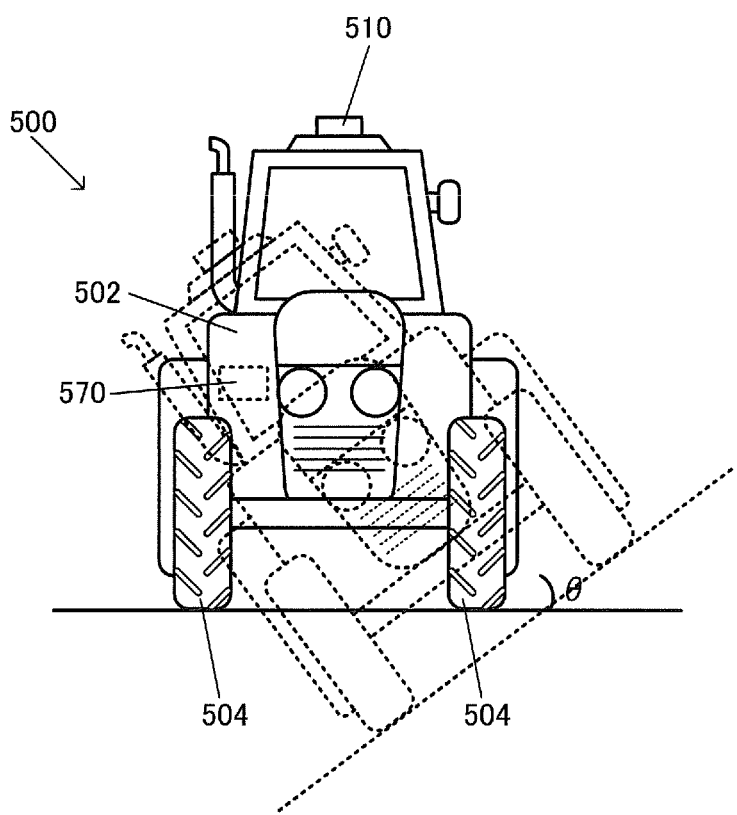
FIG. 23 shows an example of a moving object according to the embodiment.
Figure 24:
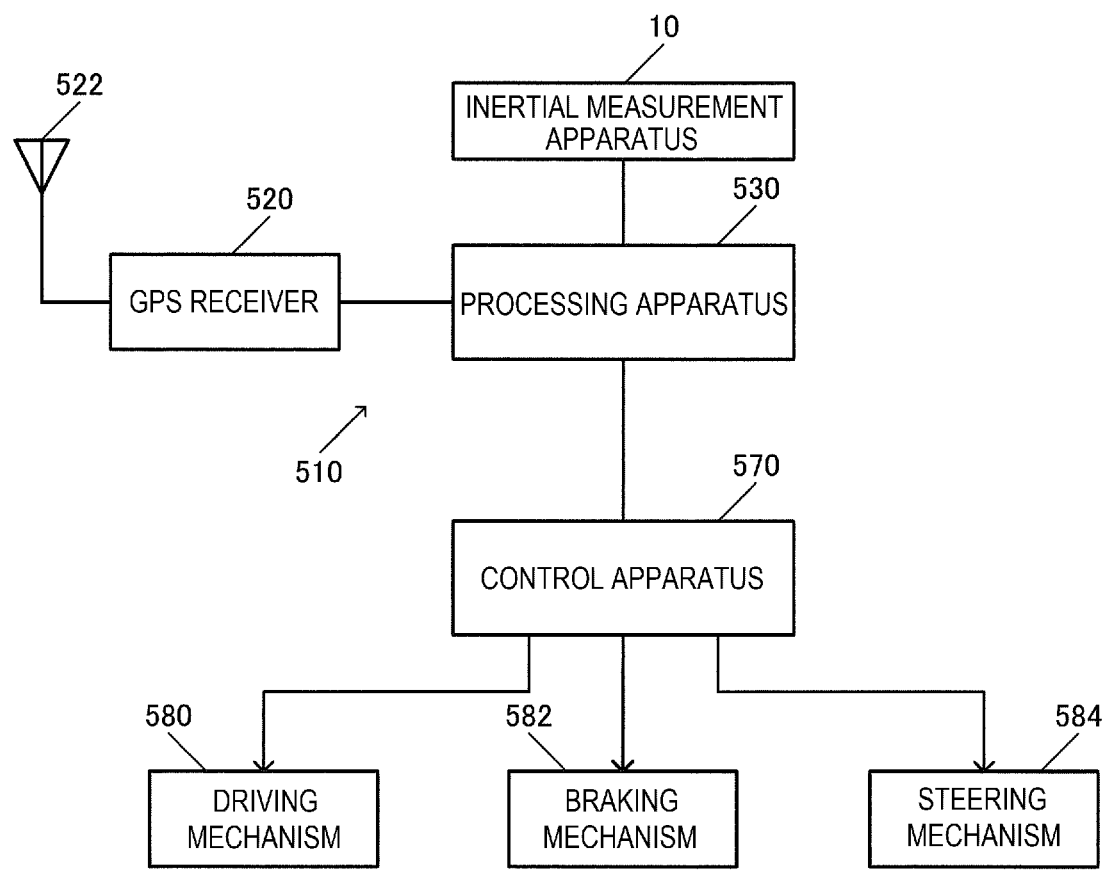
FIG. 24 is a block diagram showing an example of the configuration of the moving object.

FIG. 23 shows an example of a moving object 500 using the inertial measurement apparatus 10 according to the present embodiment. FIG. 24 is a block diagram showing an example of the configuration of the moving object 500. The moving object 500 includes the inertial measurement apparatus 10 and a processing apparatus 530, which carries out processes based on the result of the measurement performed by the inertial measurement apparatus 10.

Specifically, the moving object 500 includes a vehicle body 502 and wheels 504, as shown in FIG. 23. The moving object 500 is equipped with a positioning apparatus 510. A control apparatus 570, which performs vehicle control and other types of control, is provided in the moving object 500. The moving object 500 further includes a driving mechanism 580, such as an engine and a motor, a braking mechanism 582, such as a disk brake and a drum brake, and a steering mechanism 584, which is achieved, for example, by a steering wheel and a steering gear box, as shown in FIG. 24. As described above, the moving object 500 is any of instruments and apparatuses that include the driving mechanism 580, the braking mechanism 582, and the steering mechanism 584 and travel on the ground, in the sky, or on the sea. The moving object 500 is, for example, an automobile, such as a four-wheeled automobile and a motorcycle, a bicycle, a train, an airplane, or a ship and will be described as a four-wheeled automobile by way of example in the present embodiment.

The positioning apparatus 510 is an apparatus that is accommodated in the moving object 500 and measures the position of the moving object 500. The positioning apparatus 510 includes the inertial measurement apparatus 10 and the processing apparatus 530. The positioning apparatus 510 can further include a GPS receiver 520 and an antenna 522. The processing apparatus 530, which is a host device, receives acceleration data and angular velocity data, which are the result of the measurement performed by the inertial measurement apparatus 10, performs inertial navigation operation on the data, and outputs inertial navigation positioning data. The inertial navigation positioning data is data representing the acceleration and attitude of the moving object 500.

The GPS receiver 520 receives signals from GPS satellites via the antenna 522. The processing apparatus 530 determines GPS positioning data representing the position, speed, and orientation of the moving object 500 based on the signals received by the GPS receiver 520. The processing apparatus 530 then calculates the position of the moving object 500, specifically, the position on the ground along which the moving object 500 is traveling based on the inertial navigation positioning data and the GPS positioning data. For example, even when the GPS positioning data shows a single position of the moving object 500, but the attitude of the moving object 500 varies due to inclination (θ) of the ground and other factors, as shown in FIG. 23, the position on the ground along which the moving object 500 is traveling varies. An accurate position of the moving object 500 cannot therefore be calculated based only on the GPS positioning data. In this case, the processing apparatus 530 uses data particularly on the attitude of the moving object 500 out of the inertial navigation positioning data to calculate the position on the ground along which the moving object 500 is traveling.

The control apparatus 570 controls the driving mechanism 580, the braking mechanism 582, and the steering mechanism 584 of the moving object 500. The control apparatus 570 is a controller for vehicle control and performs a variety of types of control, such as vehicle control and automatic driving control.

The moving object 500 according to the present embodiment includes the inertial measurement apparatus 10 and the processing apparatus 530. The processing apparatus 530 performs the variety of types of processing described above based on the result of the measurement performed by the inertial measurement apparatus 10 to determine information on the position and attitude of the moving object 500. For example, the information on the position of the moving object 500 can be determined based on the GPS positioning data and the inertial navigation positioning data, as described above. The information on the attitude of the moving object 500 can be determined based, for example, on the angular velocity data contained in the inertial navigation positioning data. The control apparatus 570 then controls the attitude of the moving object 500 based, for example, on the information on the attitude of the moving object 500 determined in the process carried out by the processing apparatus 530. The attitude control can be achieved, for example, by the control apparatus 570 that controls the steering mechanism 584. Instead, to stabilize the attitude of the moving object 500, such as slip control, the control apparatus 570 may control the driving mechanism 580 or the braking mechanism 582. According to the present embodiment, the information on the attitude determined from the output signal from the inertial measurement apparatus 10 can be accurately determined, whereby the attitude and other parameters of the moving object 500 can be appropriately controlled. Further, in the present embodiment, automatic driving control can be performed on the moving object 500. In the automatic driving control, the result of monitoring an object around the moving object 500, map information, traveling route information, and other pieces of information are used in addition to the information on the position and attitude of the moving object 500.

As described above, the inertial measurement apparatus according to the present embodiment includes a first gyro sensor that has a detection axis set in the direction of a first axis, is driven at a first drive frequency, and detects angular velocity around the first axis and a second gyro sensor that has a detection axis set in the direction of a second axis, is driven at a second drive frequency different from the first drive frequency, and detects angular velocity around the second axis. The inertial measurement apparatus further includes a third gyro sensor that has a detection axis set in the direction of a third axis, is driven at a third drive frequency different from the first and second drive frequencies, and detects angular velocity around the third axis. The inertial measurement apparatus further includes a substrate on which the first, second, and third gyro sensors are provided. The natural vibration frequency of the substrate is set at a frequency that does not coincide with any of fd1, fd2, and fd3, where fd1 represents the first drive frequency, fd2 represents the second drive frequency, and fd3 represents the third drive frequency.

According to the present embodiment, the first, second, and third gyro sensors provided on the substrate can be used to detect angular velocity around the first, second, and third axes. In the present embodiment, the natural vibration frequency of the substrate is set at a frequency that does not coincide with any of drive frequencies fd1, fd2, and fd3. The configuration described above, which prevents the vibration of the first, second, and third gyro sensors driven at the drive frequencies fd1, fd2, and fd3 from leaking out of the gyro sensors so that the vibration leakage causes the substrate to resonate, can prevent deterioration of the sensor characteristics of the gyro sensors and unstable driving of the gyro sensors. Further, the configuration in which the drive frequencies fd1, fd2, and fd3, at which the first, second, and third gyro sensors are driven, differ from one another can reduce the influence of the inter-axis interference in the multi-axis gyro sensor and therefore prevent a decrease in the detection performance due to the inter-axis interference. The provided inertial measurement apparatus can therefore reduce the adverse effect due to the resonance of the substrate and the adverse effect due to the inter-axis interference while achieving a multi-axis gyro sensor including the first, second, and third gyro sensors provided on the substrate.

In the present embodiment, the vibration modes resulting from vibration excitation in the directions of the first, second, and third axes may be called first-axis, second-axis, and third-axis vibration modes, and the natural vibration frequency of the substrate in each of the first-axis, second-axis, and third-axis vibration modes may be set at a frequency that does not coincide with any of fd1, fd2, and fd3.

Therefore, even when the vibration leakage occurs in any of the directions of the detection axes of the first, second, and third gyro sensors, the resonance of the substrate due to the vibration leakage can be avoided, whereby deterioration of the sensor characteristics of the gyro sensors and unstable driving of the gyro sensors can be avoided.

Let fA be the natural vibration frequency of the substrate in the first vibration mode, which is any of the first-axis, second-axis, and third-axis vibration modes and fB be the natural vibration frequency of the substrate in the second vibration mode, which is any of the first-axis, second-axis, and third-axis vibration modes. Further, let fmin be the minimum frequency of fd1, fd2, and fd3 and fmax be the maximum frequency of fd1, fd2, and fd3. Under the definitions described above, fA<fmin<fmax<fB may be satisfied in the present embodiment.

The natural vibration frequencies fA and fB in the first and second vibration modes are thus set at frequencies different from those that fall within the drive frequency range from fmin to fmax. It is therefore ensured that the drive frequencies fd1, fd2, and fd3, which fall within the range from fmin to fmax, each do not coincide with any of the natural vibration frequencies fA and fB in the first and second vibration modes, whereby the resonance of the substrate due to the vibration leakage can be avoided.

Further, in the present embodiment, f1A<fmin<fmax<f1B and f2A<fmin<fmax<f2B may be satisfied, where f1A and f1B represent two natural vibration frequencies adjacent to each other in the first-axis vibration mode, f2A and f2B represent two natural vibration frequencies adjacent to each other in the second-axis vibration mode, fmin represents the minimum frequency of fd1, fd2, and fd3, and fmax represents the maximum frequency of fd1, fd2, and fd3.

Therefore, in the first-axis vibration mode, the relationship f1A<fmin<fmax<f1B is satisfied, and also in the second-axis vibration mode, the relationship f2A<fmin<fmax<f2B is satisfied. The resonance of the substrate due to the vibration leakage can therefore be avoided in both the first-axis and second-axis vibration modes, whereby deterioration of the sensor characteristics of the gyro sensors and unstable driving of the gyro sensors can be avoided.

In the present embodiment, the natural vibration frequencies in the third-axis vibration mode may be set at frequencies different from any of fd1, fd2, and fd3 within the frequency range that satisfies f1A<fmin<fmax<f1B and f2A<fmin<fmax<f2B.

Therefore, the natural vibration frequencies each do not coincide with any of the drive frequencies fd1, fd2, and fd3 in the first-axis and second-axis vibration modes, and the natural vibration frequencies each do not coincide with any of the drive frequencies fd1, fd2, and fd3 also in the third-axis vibration mode. The resonance of the substrate due to the leakage of the vibration of any of the first, second, and third gyro sensors can therefore be avoided.

In the present embodiment, the first axis may be the axis X, which is parallel to the substrate, the second axis may be the axis Y, which is parallel to the surfaces of the substrate and perpendicular to the axis X, and the third axis may be the axis Z, which is perpendicular to the surfaces of the substrate.

The thus set first, second, and third axes allow achievement of a three-axis gyro sensor module capable of detecting angular velocity around the axis X, angular velocity around the axis Y, and angular velocity around the axis Z.

In the present embodiment, the natural vibration frequency of the substrate may be set based on the thickness of the substrate in the direction perpendicular to the substrate.

Therefore, since the natural vibration frequency can be adjusted with no change in the planar size of the substrate, occurrence of the problems due to the resonance of the substrate resulting from the vibration leakage can be avoided.

In the present embodiment, the substrate may be a ceramic substrate, and the first, second, and third gyro sensors may each be a gyro sensor accommodated in a ceramic package.

Using a ceramic substrate as the substrate as described above allows the natural vibration frequency of the substrate to be readily set at a frequency that does not coincide with any of the drive frequencies. Further, the difference in the coefficient of linear expansion between the package and the substrate can be reduced to a small value, whereby deterioration of the sensor characteristics and a decrease in the mounting reliability due to the stress resulting from the difference in the coefficient of linear expansion can be suppressed.

In the present embodiment, the printed substrate may be a resin substrate, the inertial sensors may each be an inertial sensor accommodated in a ceramic package, and the difference in the coefficient of linear expansion between the resin substrate and the ceramic package may be smaller than or equal to 30%.

The difference in the coefficient of linear expansion between the package of each of the inertial sensors and the printed substrate can thus be small, whereby deterioration of the detection characteristics of each of the inertial sensors and a decrease in the reliability of mounting the inertial sensor on the printed substrate due to the stress resulting from the difference in the coefficient of linear expansion can be suppressed.

In the present embodiment, the inertial measurement apparatus may include a sensor module that includes the first, second, and third gyro sensors and the substrate and a support member for supporting the substrate of the sensor module on an attachment surface.

The substrate of the sensor module on which the first, second, and third gyro sensors are provided can thus be supported by the support member on the attachment surface.

In the present embodiment, the support member may be a lead group, and leads of the lead group may each have a first section coupled to the attachment surface, a second section extending from the first section toward the substrate in a direction that intersects the attachment surface, and a third section coupled to the substrate.

The lead group can therefore reduce the stress induced by the difference in the coefficient of linear expansion. Deterioration of the sensor characteristics and deterioration of the mounting reliability due to the stress resulting from the difference in the coefficient of linear expansion can therefore be suppressed.

In the present embodiment, the lead group may include a first lead group provided in correspondence with the first edge of the substrate and a second lead group provided in correspondence with the second edge facing the first edge of the substrate.

Therefore, the first lead group can support the first edge of the substrate, and the second lead group can support the second edge of the substrate. Even when stress is induced in the direction, for example, from the first edge toward the second edge due to the difference in the coefficient of linear expansion, the stress can be appropriately reduced.

In the present embodiment, the leads may be gullwing-type leads, and the third section may be coupled to the second surface of the substrate, which is the surface opposite the first surface, on which the first, second, and third gyro sensors are provided.

Using the leads each formed of a gullwing-type lead allows the second section of each of the gullwing-type leads to be deformed or otherwise changed to reduce the stress resulting from the difference in the coefficient of linear expansion, whereby deterioration of the sensor characteristics and deterioration of the mounting reliability can be suppressed.

In the present embodiment, the third sections of the leads may be coupled with solder to the external connection terminals on the substrate.

The third sections of the leads can thus be coupled to the external connection terminals on the substrate by the solder-based reliable mounting.

The present embodiment further relates to an electronic instrument including the inertial measurement apparatus described above and a processing apparatus that carries out processes based on the result of the measurement performed by the inertial measurement apparatus.

The present embodiment further relates to a moving object including the inertial measurement apparatus described above and a processing apparatus that carries out processes based on the result of the measurement performed by the inertial measurement apparatus.

The present embodiment has been described above in detail, and a person skilled in the art will readily appreciate that a large number of variations are conceivable to the extent that they do not substantially depart from the novel items and advantageous effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, any combination of the present embodiment and the variations fall within the scope of the present disclosure. Moreover, the configuration, operation, and other factors of each of the inertial measurement apparatus, the electronic instrument, and the moving object are not limited to those described in the present embodiment, and a variety of changes can be made thereto.

What is claimed is:

1. An inertial measurement apparatus comprising:
a first gyro sensor that has a detection axis set in a direction of a first axis, is driven at a first drive frequency, and detects angular velocity around the first axis;
a second gyro sensor that has a detection axis set in a direction of a second axis, is driven at a second drive frequency different from the first drive frequency, and detects angular velocity around the second axis;
a third gyro sensor that has a detection axis set in a direction of a third axis, is driven at a third drive frequency different from the first and second drive frequencies, and detects angular velocity around the third axis; and
a substrate on which the first, second, and third gyro sensors are provided,
wherein a natural vibration frequency of the substrate is set at a frequency that does not coincide with any of fd1, fd2, and fd3, where fd1 represents the first drive frequency, fd2 represents the second drive frequency, and fd3 represents the third drive frequency,
vibration modes resulting from vibration excitation in the directions of the first, second, and third axes are called first-axis, second-axis, and third-axis vibration modes,
wherein the natural vibration frequency of the substrate in each of the first-axis, second-axis, and third-axis vibration modes is set at a frequency that does not coincide with any of fd1, fd2, and fd3, and
wherein fA<fmin<fmax<fB is satisfied, where fA represents the natural vibration frequency of the substrate in a first vibration mode that is any of the first-axis, second-axis and third-axis vibration modes, fB represents the natural vibration frequency of the substrate in a second vibration mode that is any of the first-axis, second-axis, and third-axis vibration modes, fmin represents a minimum frequency of fd1, fd2, and fd3, and fmax represents a maximum frequency of fd1, fd2, and fd3.

2. An inertial measurement apparatus comprising:
a first gyro sensor that has a detection axis set in a direction of a first axis, is driven at a first drive frequency and detects angular velocity around the first axis;
a second gyro sensor that has a detection axis set in a direction of a second axis, is driven at a second drive frequency different from the first drive frequency, and detects angular velocity around the second axis;
a third gyro sensor that has a detection axis set in a direction of a third axis, is driven at a third drive frequency different from the first and second drive frequencies, and detects angular velocity around the third axis; and
a substrate on which the first, second, and third gyro sensors are provided,
wherein a natural vibration frequency of the substrate is set at a frequency that does not coincide with any of fd1, fd2, and fd3, where fd1 represents the first drive frequency, fd2 represents the second drive frequency, and fd3 represents the third drive frequency,
wherein vibration modes resulting from vibration excitation in the directions of the first, second, and third axes are called first-axis, second-axis, and third-axis vibration modes,
wherein the natural vibration frequency of the substrate in each of the first-axis, second-axis, and third-axis vibration modes is set at a frequency that does not coincide with any of fd1, fd2, and fd3, and wherein f1A<fmin<fmax<f1B and f2A<fmin<fmax<f2B are satisfied, where f1A and f1B represent two of the natural vibration frequencies adjacent to each other in the first-axis vibration mode, f2A and f2B represent two of the natural vibration frequencies adjacent to each other in the second-ads vibration mode, fmin represents a minimum frequency of fd1, fd2, and fd3, and fmax represents a maximum frequency of fd1, fd2, and fd3.

3. The inertial measurement apparatus according to claim 2, wherein the natural vibration frequencies in the third-axis vibration mode are set at frequencies different from any of fd1, fd2, and fd3 within a frequency range that satisfies f1A<fmin<fmax<f1B and f2A<fmin<fmax<f2B.

4. The inertial measurement apparatus according to claim 1, wherein the first axis is an axis X, which is parallel to the substrate, the second axis is an axis Y, which is parallel to a surface of the substrate and perpendicular to the axis X, and the third axis is an axis Z, which is perpendicular to the surface of the substrate.

5. The inertial measurement apparatus according to claim 1, wherein the natural vibration frequency of the substrate is set based on a thickness of the substrate in a direction perpendicular to the substrate.

6. The inertial measurement apparatus according to claim 1, wherein the substrate is a ceramic substrate, and the first, second, and third gyro sensors are each a gyro sensor accommodated in a ceramic package.

7. The inertial measurement apparatus according to claim 1, wherein the substrate is a resin substrate, the first, second, and third gyro sensors are each a gyro sensor accommodated in a ceramic package, and a difference in a coefficient of linear expansion between the resin substrate and the ceramic package is smaller than or equal to 30%.

8. The inertial measurement apparatus according to claim 1, further comprising:

a sensor module that includes the first, second, and third gyro sensors and the substrate; and a support member for supporting the substrate of the sensor module on an attachment surface.

9. The inertial measurement apparatus according to claim 8, wherein the support member is a lead group, and leads of the lead group each have a first section coupled to the attachment surface, a second section extending from the first section toward the substrate in a direction that intersects the attachment surface, and a third section coupled to the substrate.

10. The inertial measurement apparatus according to claim 9, wherein the lead group includes a first lead group provided in correspondence with a first edge of the substrate and a second lead group provided in correspondence with a second edge of the substrate that is an edge facing the first edge.

11. The inertial measurement apparatus according to claim 9, wherein the leads are gullwing-type leads, and the third section is coupled to the second surface of the substrate, which is a surface opposite the first surface, on which the first, second, and third gyro sensors are provided.

12. The inertial measurement apparatus according to claim 9, wherein the third sections of the leads are coupled with solder to external connection terminals on the substrate.

13. An electronic instrument comprising:

the inertial measurement apparatus according to claim 1; and a processing apparatus that carries out processes based on a result of measurement performed by the inertial measurement apparatus.

* * * * *